US012271038B2

(12) United States Patent
Morita et al.

(10) Patent No.: US 12,271,038 B2
(45) Date of Patent: Apr. 8, 2025

(54) OPTICAL CONNECTOR, OPTICAL CABLE, AND ELECTRONIC DEVICE

(71) Applicant: SONY GROUP CORPORATION, Tokyo (JP)

(72) Inventors: Hiroshi Morita, Tokyo (JP); Kazuaki Toba, Tokyo (JP); Masanari Yamamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 393 days.

(21) Appl. No.: 17/593,943

(22) PCT Filed: Mar. 25, 2020

(86) PCT No.: PCT/JP2020/013494
§ 371 (c)(1),
(2) Date: Sep. 28, 2021

(87) PCT Pub. No.: WO2020/209075
PCT Pub. Date: Oct. 15, 2020

(65) Prior Publication Data
US 2022/0179157 A1      Jun. 9, 2022

(30) Foreign Application Priority Data

Apr. 11, 2019   (JP) ................................ 2019-075342

(51) Int. Cl.
*G02B 6/38*      (2006.01)
*G02B 6/32*      (2006.01)

(52) U.S. Cl.
CPC ............. *G02B 6/3853* (2013.01); *G02B 6/32* (2013.01); *G02B 6/3821* (2013.01);
(Continued)

(58) Field of Classification Search
CPC .. G02B 6/3825; G02B 6/3869; G02B 6/3871; G02B 6/3875
See application file for complete search history.

(56) References Cited

U.S. PATENT DOCUMENTS

| 5,121,454 A | 6/1992 | Iwano et al. |
| 5,138,679 A * | 8/1992 | Edwards .............. G02B 6/4246 385/52 |

(Continued)

FOREIGN PATENT DOCUMENTS

| CA | 2030897 A1 | 5/1991 |
| CA | 2277391 A1 | 1/2000 |

(Continued)

OTHER PUBLICATIONS

International Search Report and Written Opinion of PCT Application No. PCT/JP2020/013494, issued on Jun. 30, 2020, 09 pages of ISRWO.

*Primary Examiner* — Michelle R Connelly
(74) *Attorney, Agent, or Firm* — CHIP LAW GROUP

(57) ABSTRACT

Provided is an optical connector capable of implementing a floating function while keeping a depth direction short. The optical connector includes a connector body and a regulation portion. The connector body is disposed inside the connector housing. The regulation portion regulates a movable region on a rear surface side of the connector body, the movable region being in one direction orthogonal to a front-rear direction of the connector housing with respect to the connector housing. For example, the regulation portion includes a guiderail portion provided in the connector housing or the connector body. For example, the movable region is an arc-shaped region having a center on a front surface side of the connector body.

15 Claims, 26 Drawing Sheets

(52) U.S. Cl.
 CPC ......... *G02B 6/3826* (2013.01); *G02B 6/3869* (2013.01); *G02B 6/3871* (2013.01); *G02B 6/3882* (2013.01); *G02B 6/3887* (2013.01)

(56) References Cited

U.S. PATENT DOCUMENTS

| | | | |
|---|---|---|---|
| 6,085,003 A | 7/2000 | Knight | |
| 6,293,708 B1* | 9/2001 | Ohtsuka | G02B 6/3825 |
| | | | 385/83 |
| 8,107,823 B2* | 1/2012 | Ishii | G02B 6/4292 |
| | | | 385/139 |
| 9,851,511 B2* | 12/2017 | Li | G02B 6/3821 |
| 9,977,195 B2* | 5/2018 | Takano | G02B 6/3885 |
| 9,989,708 B1* | 6/2018 | Grinderslev | G02B 6/3875 |
| 2002/0186931 A1* | 12/2002 | Seo | G02B 6/3875 |
| | | | 385/60 |
| 2009/0052844 A1* | 2/2009 | Van Der Steen | G02B 6/3869 |
| | | | 385/60 |
| 2017/0010421 A1* | 1/2017 | Pitwon | G02B 6/389 |
| 2017/0261696 A1* | 9/2017 | Compton | G02B 6/4432 |
| 2018/0314015 A1* | 11/2018 | Otomitsu | G02B 6/36 |
| 2019/0235182 A1* | 8/2019 | Cheng | G02B 6/3871 |

FOREIGN PATENT DOCUMENTS

| | | |
|---|---|---|
| EP | 430107 A2 | 6/1991 |
| JP | 3-164704 A | 7/1991 |
| JP | 4-281412 A | 10/1992 |
| JP | 9-133832 A | 5/1997 |
| JP | 2001-264589 A | 9/2001 |
| JP | 2002-318324 A | 10/2002 |
| KR | 10-1994-0000836 B1 | 1/1994 |
| WO | WO-2018180898 A1 * | 10/2018 ............... G02B 6/38 |

\* cited by examiner

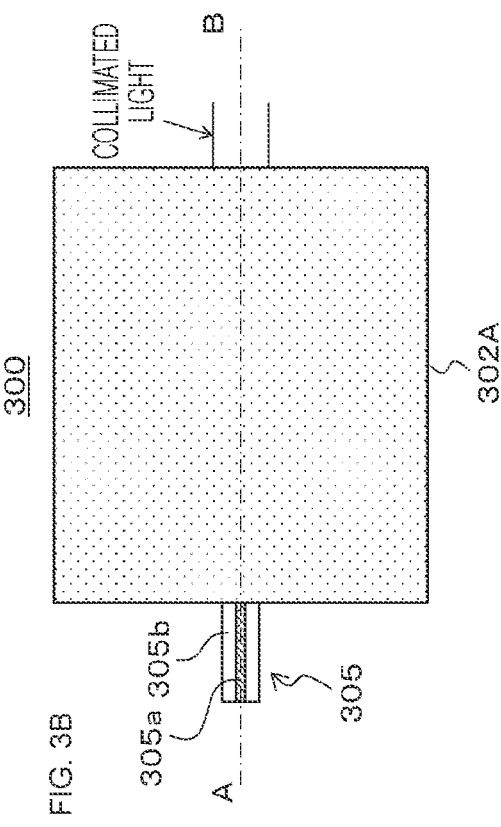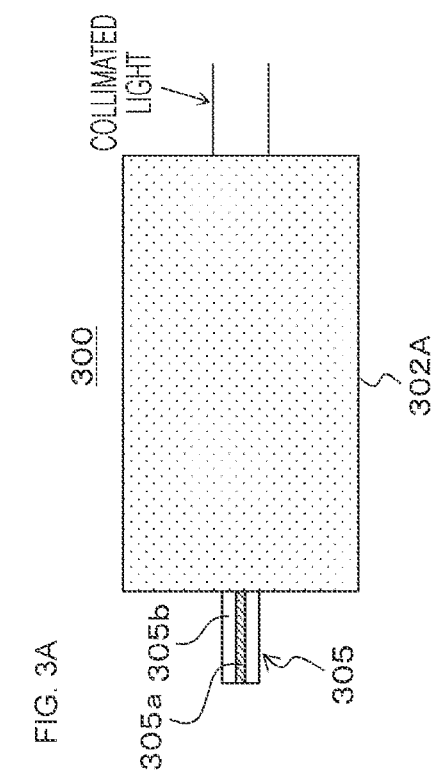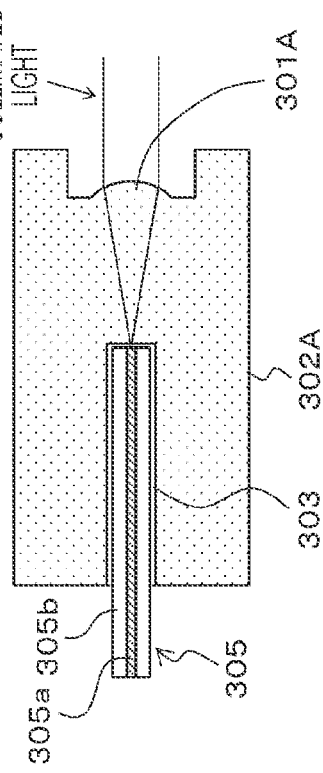

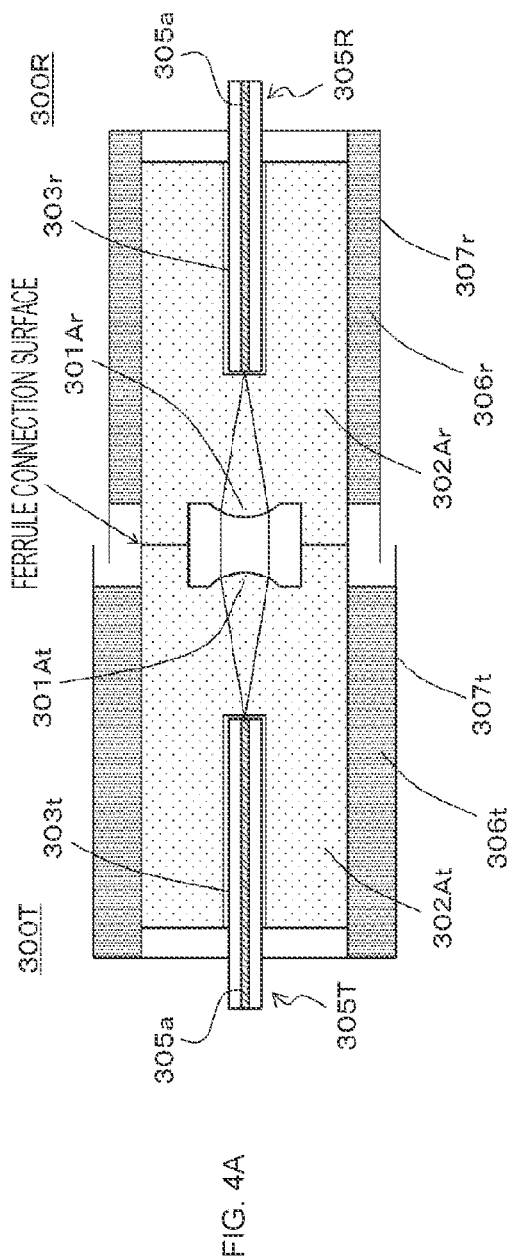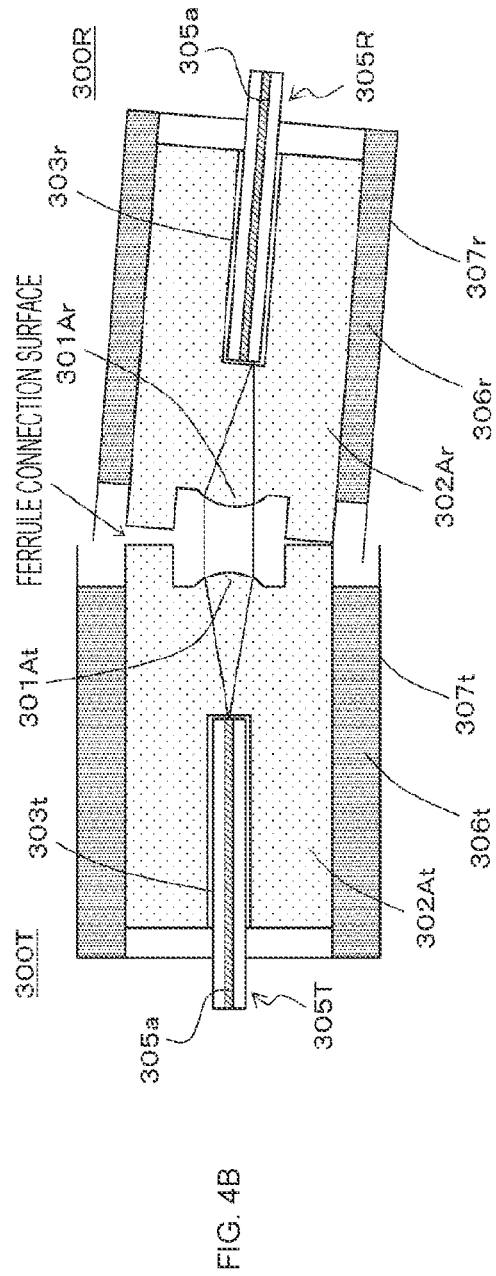
FIG. 4A
FIG. 4B

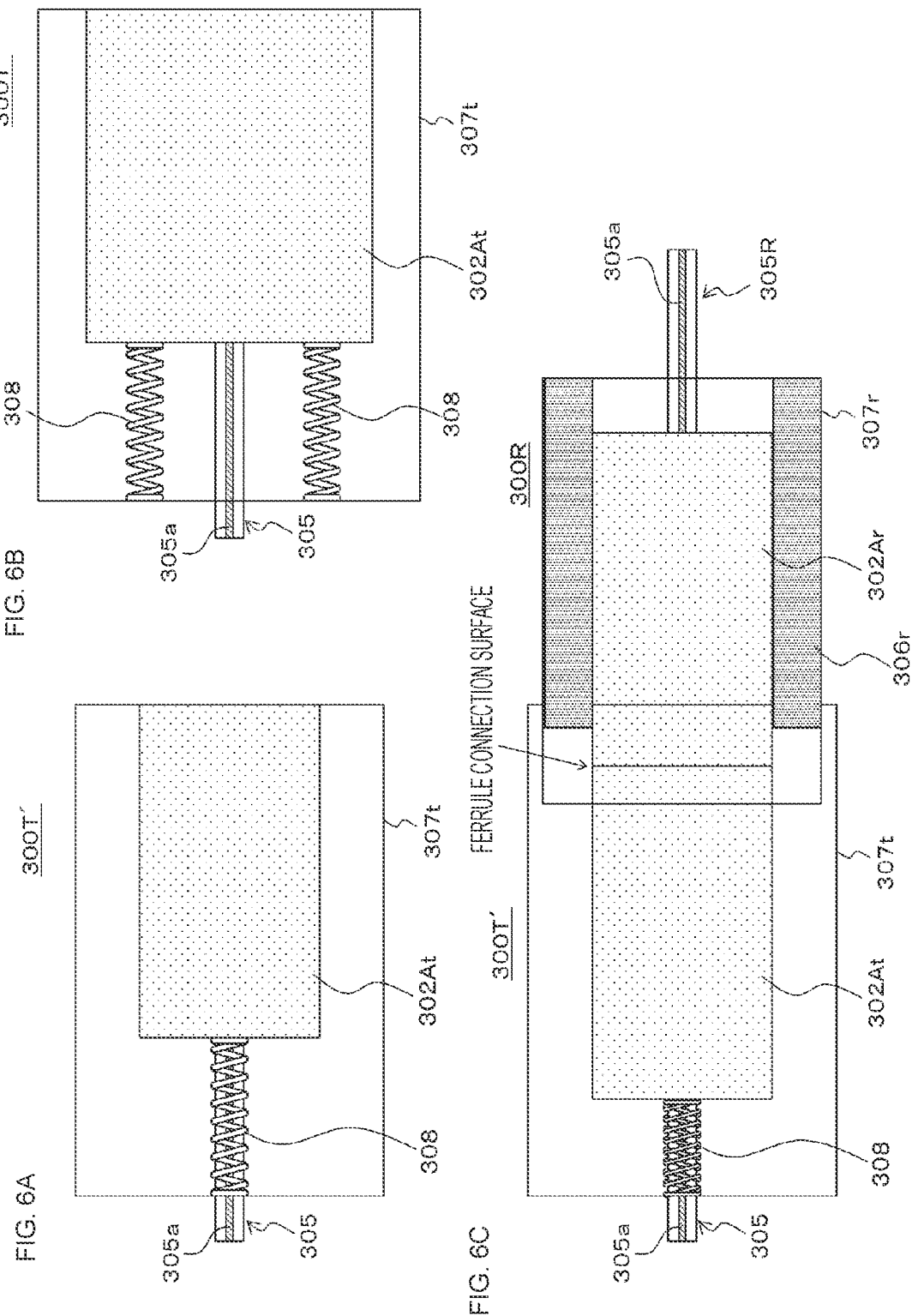

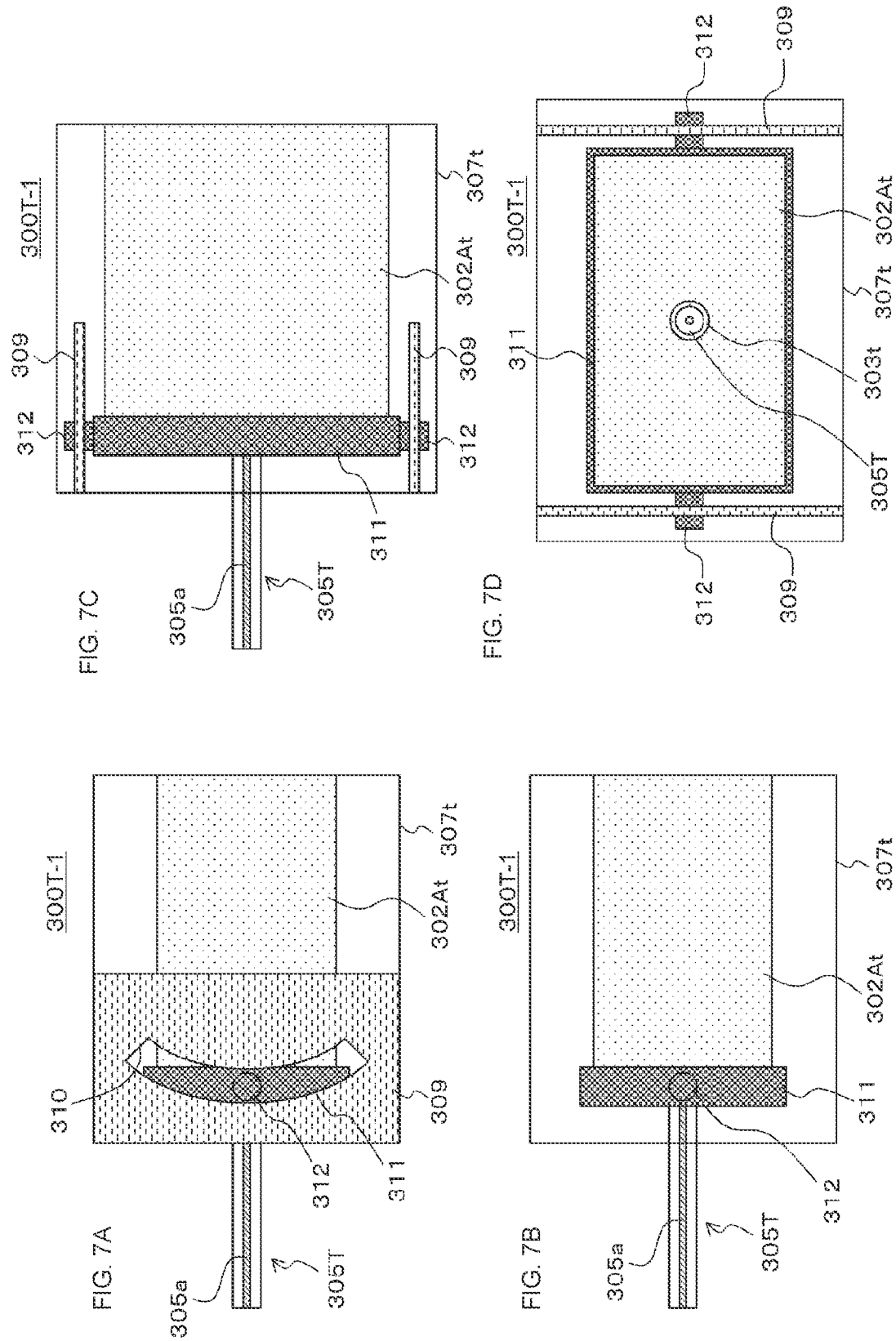

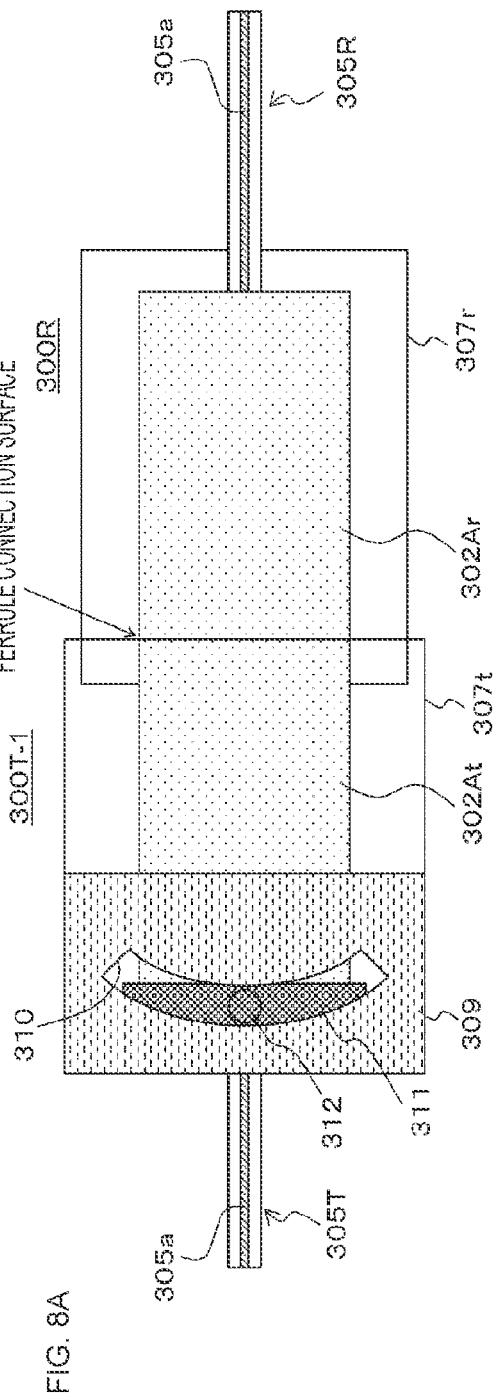

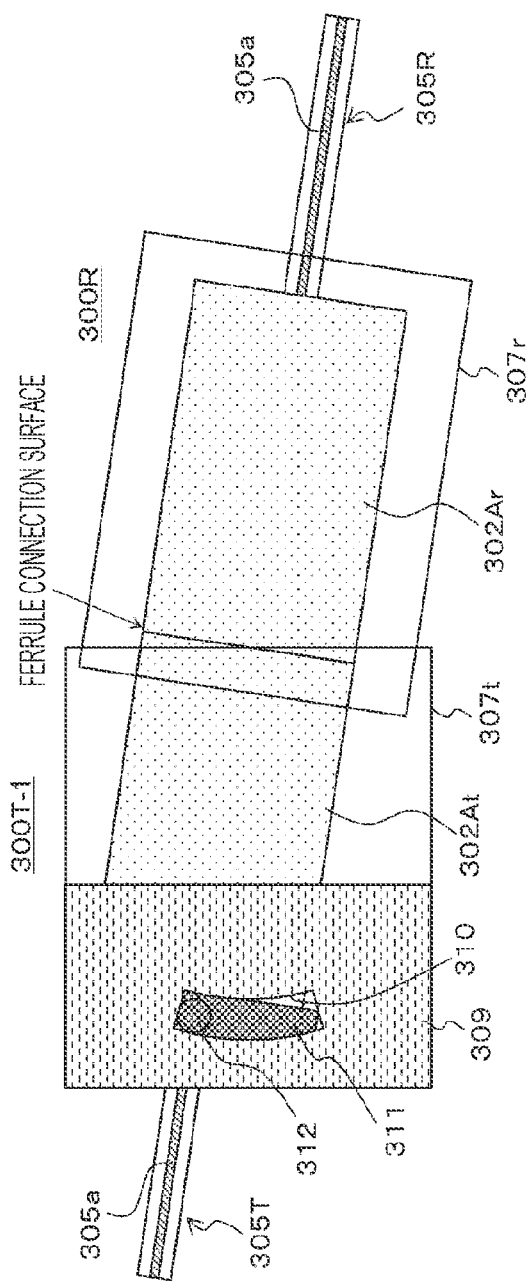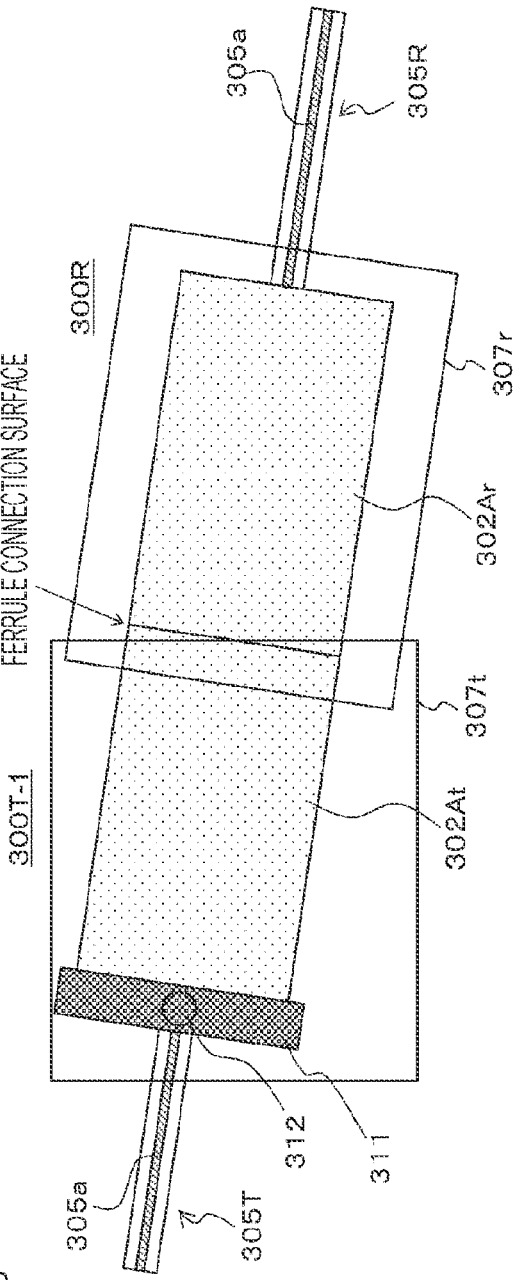
FIG. 9A
FIG. 9B

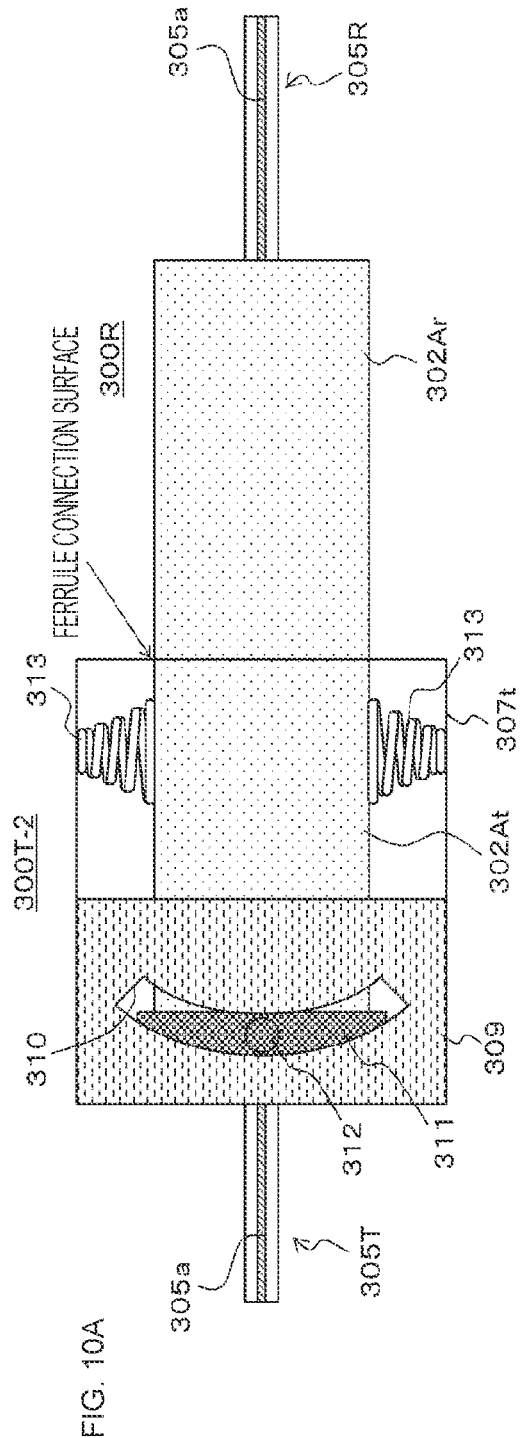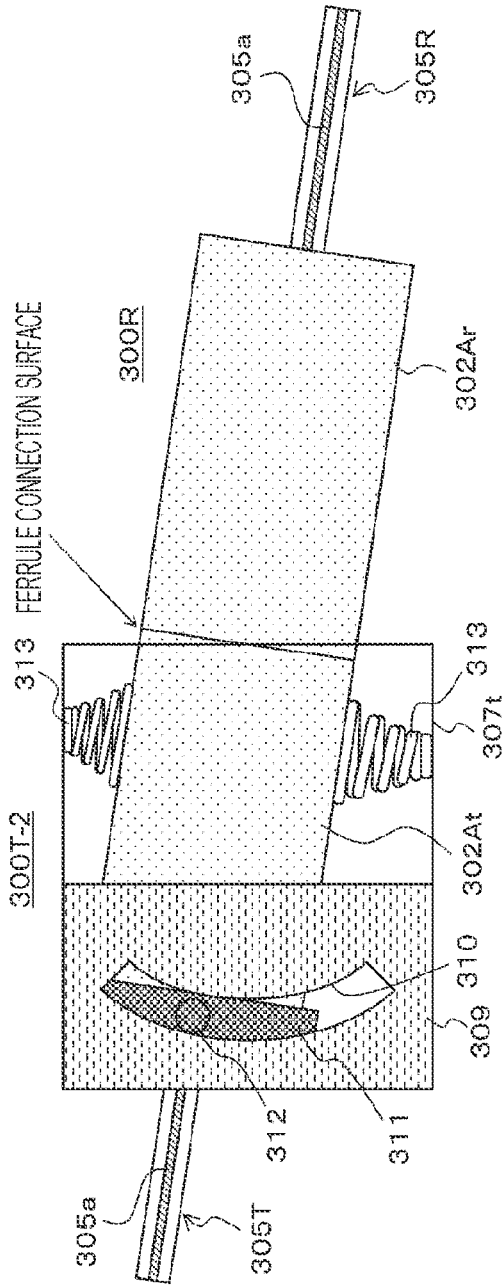
FIG. 10A
FIG. 10B

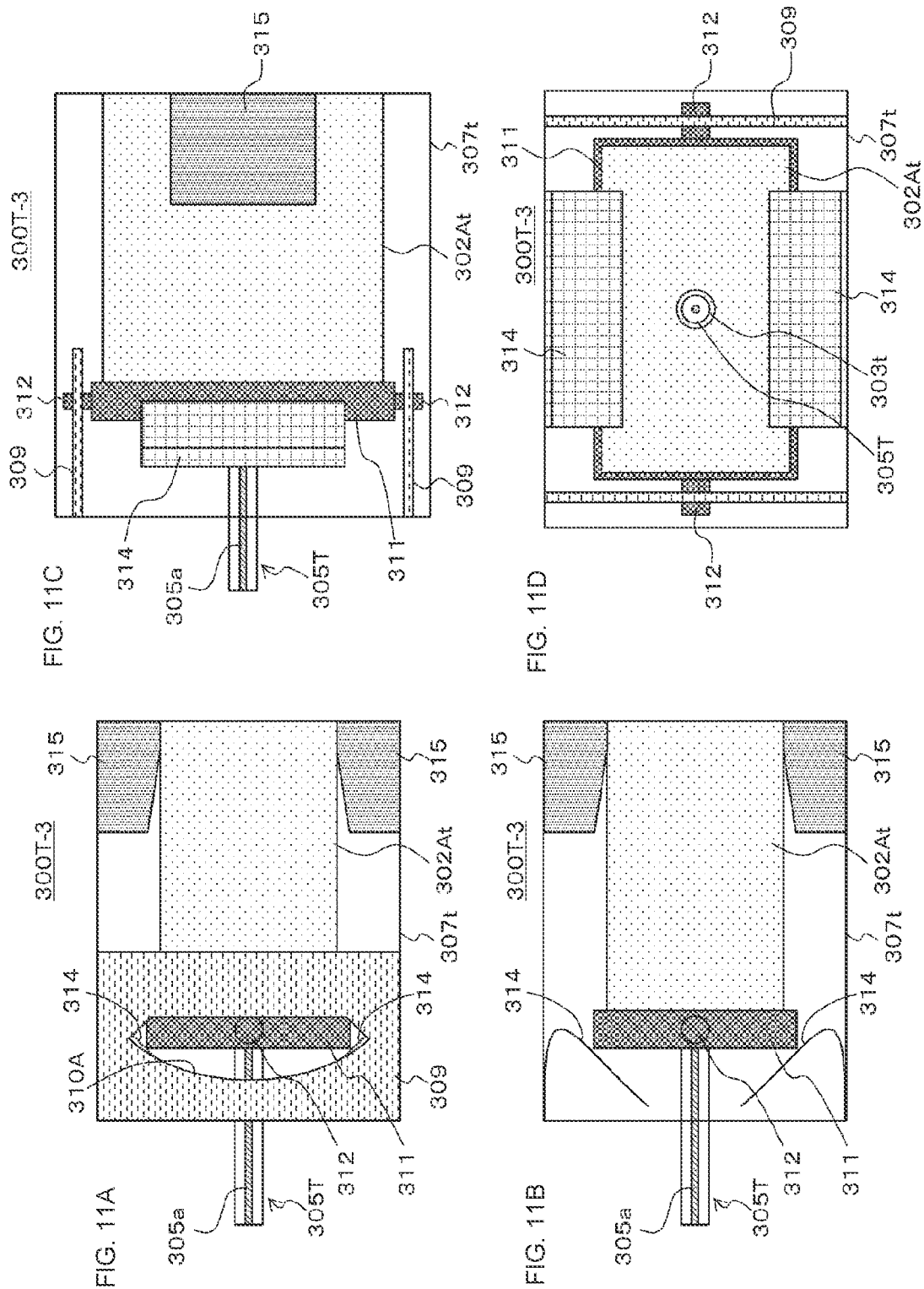

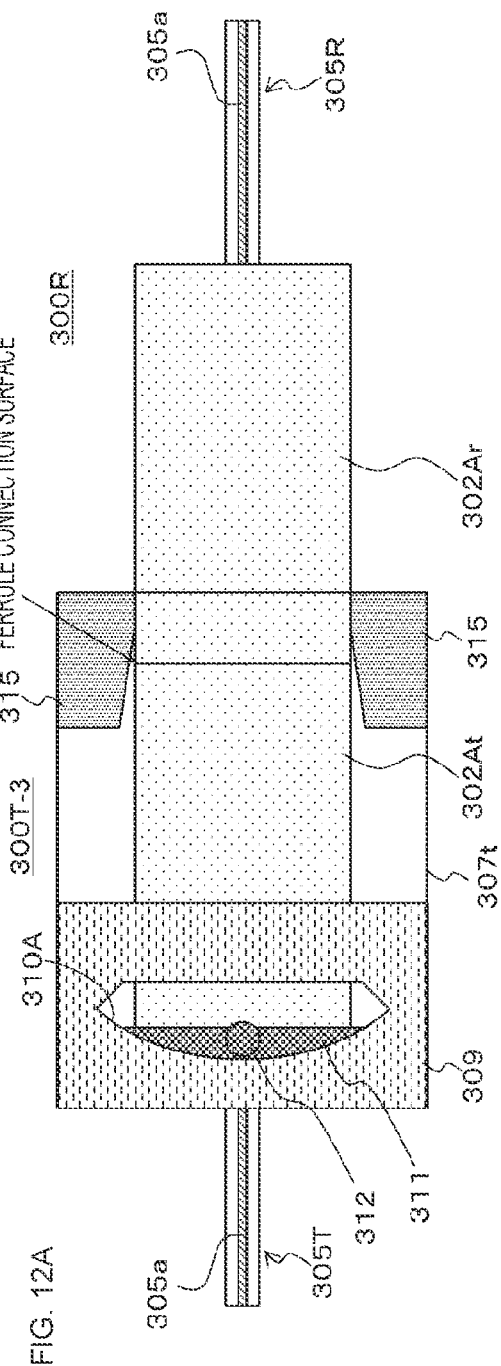
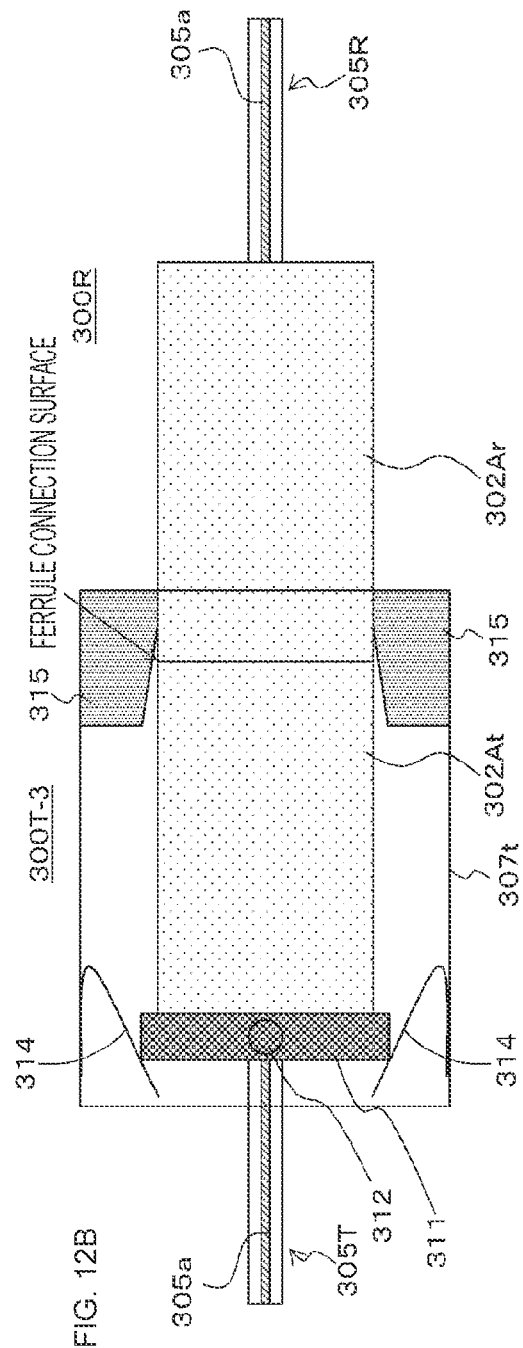

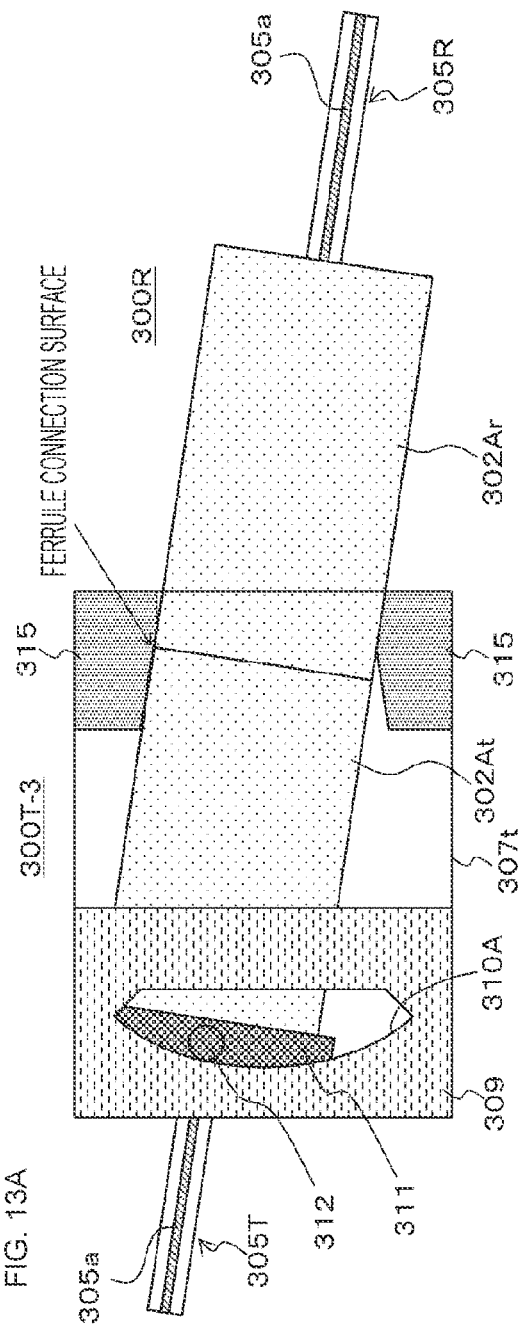
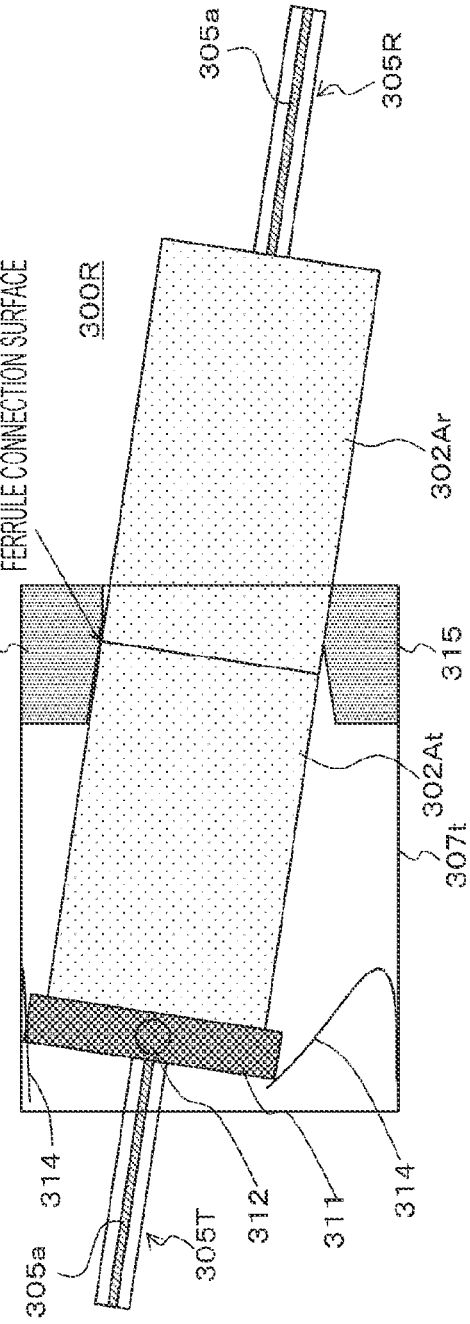

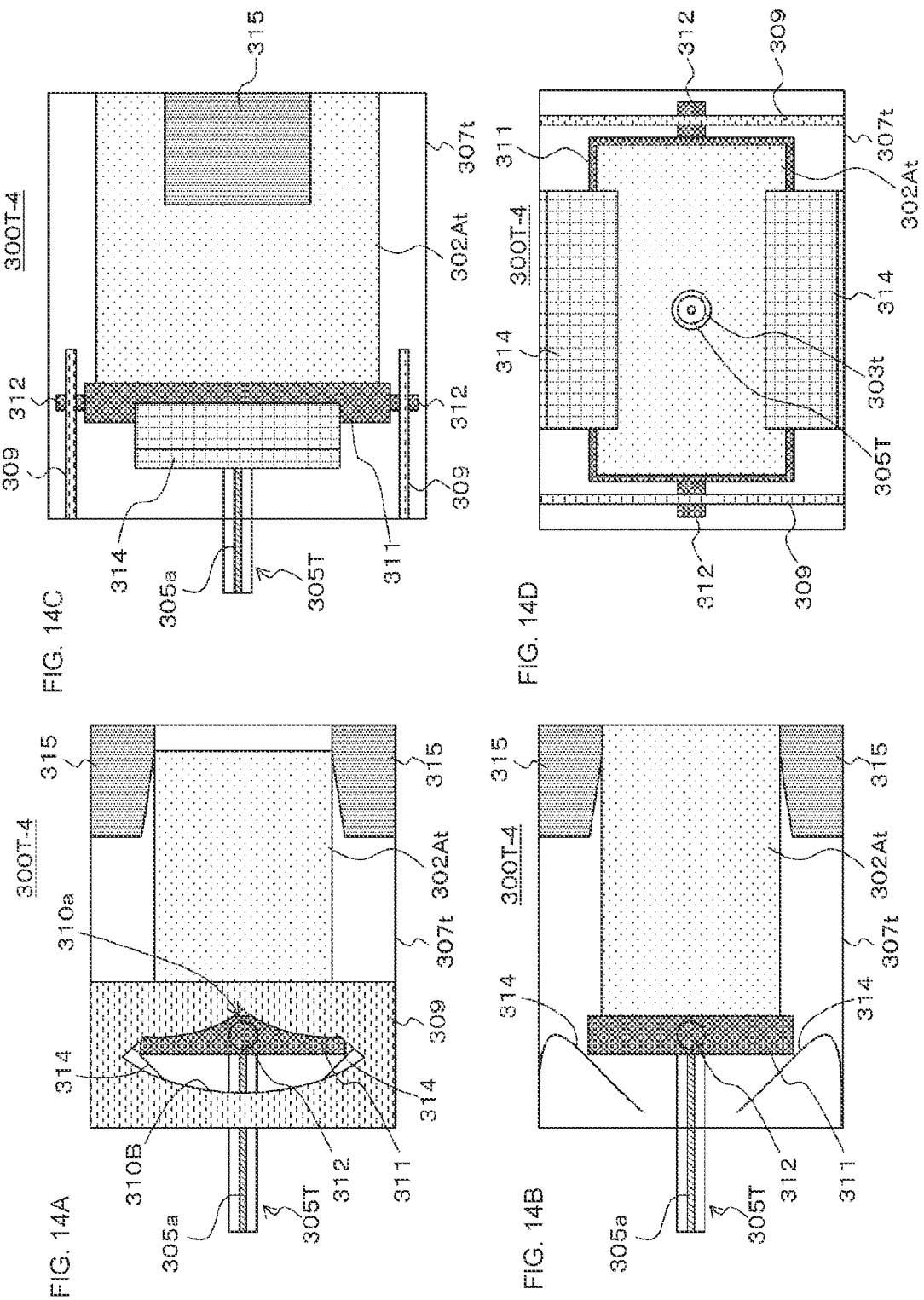

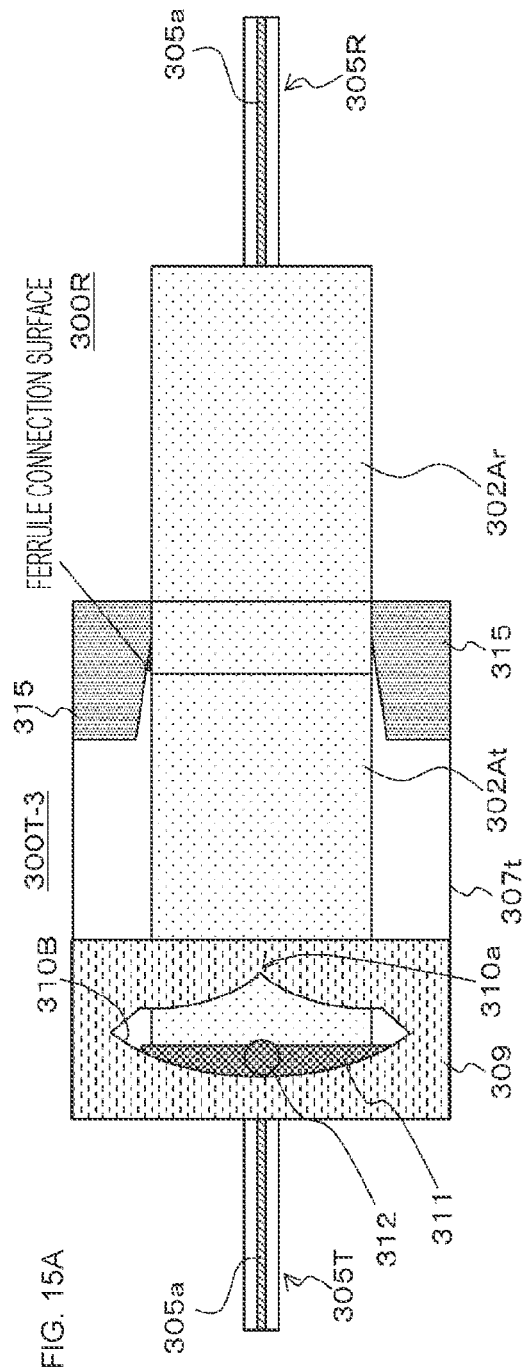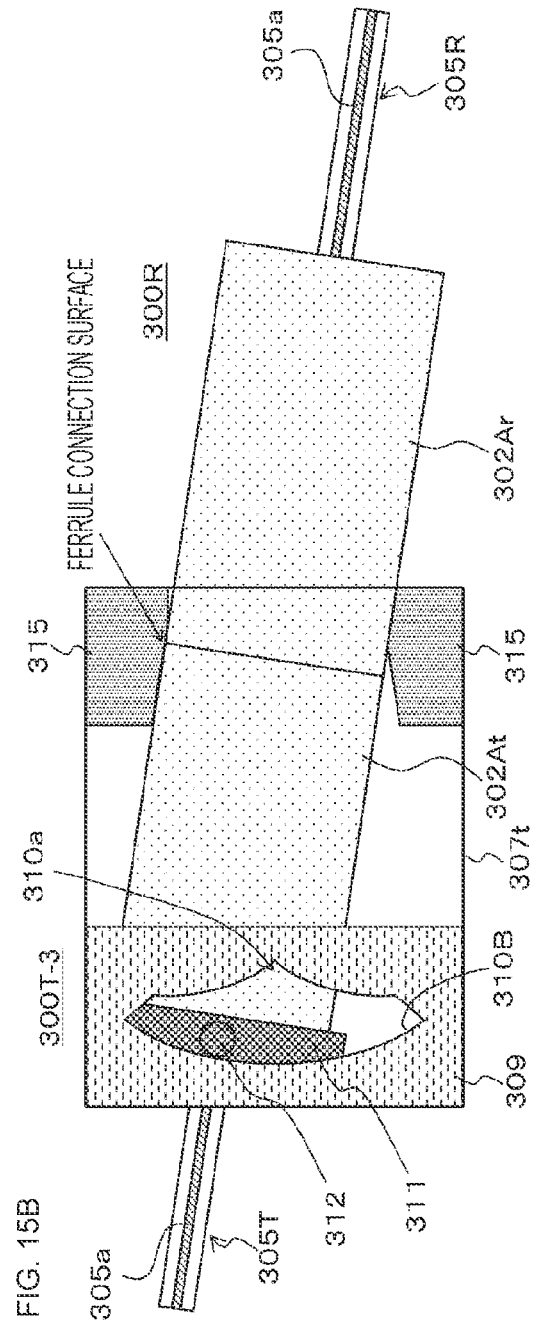
FIG. 15A
FIG. 15B

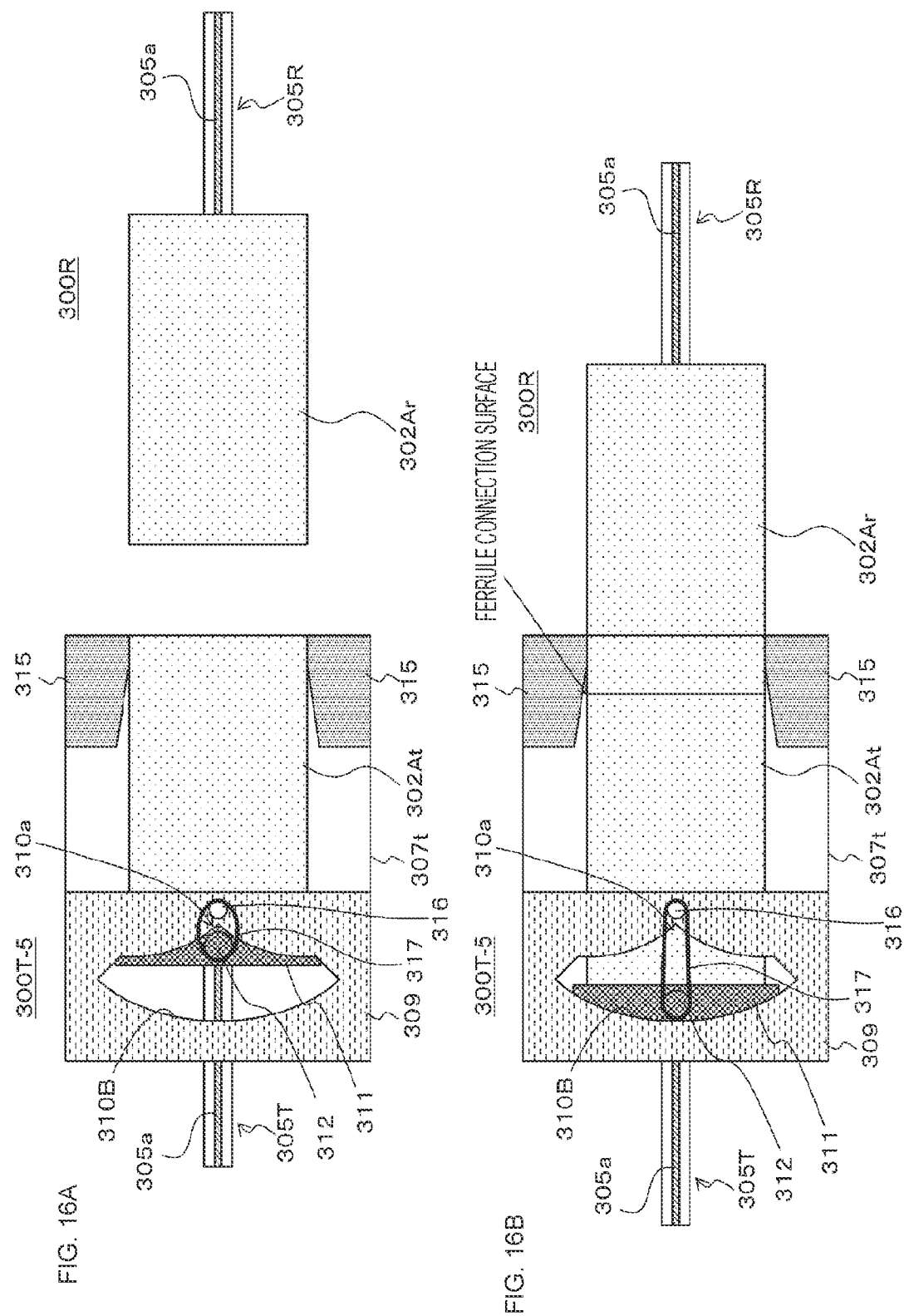

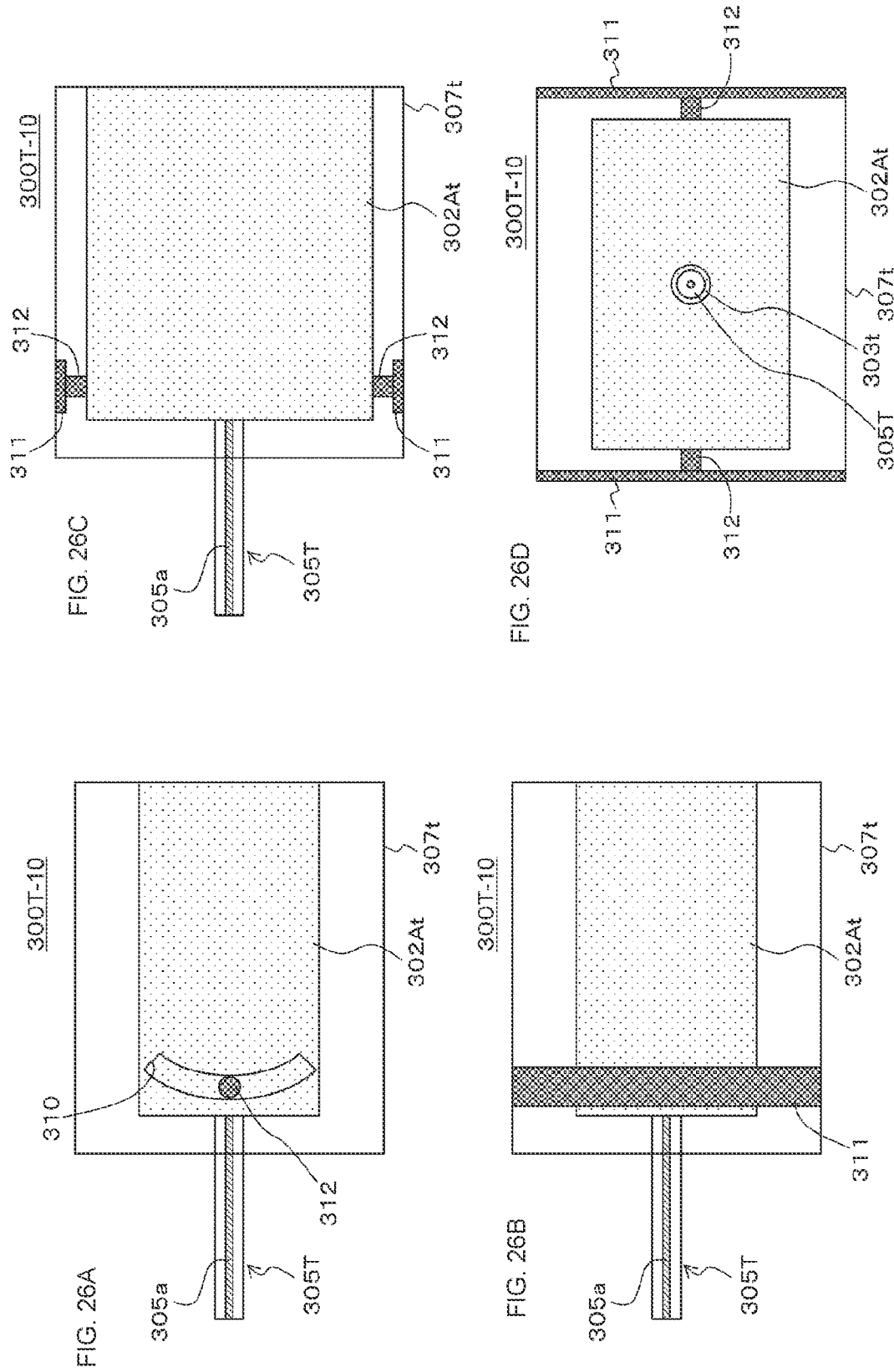

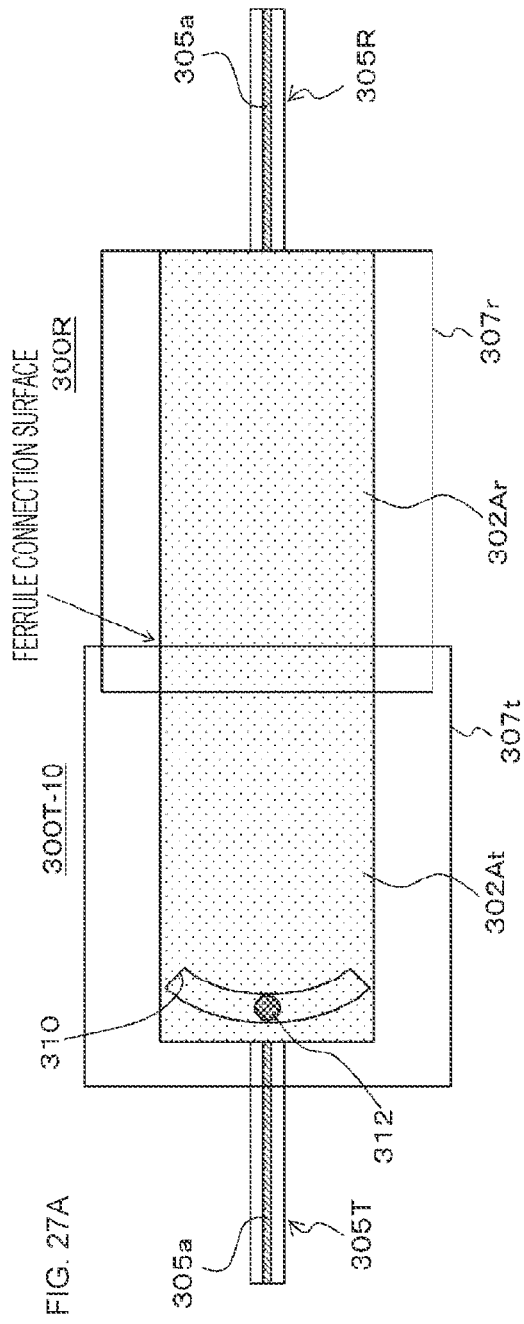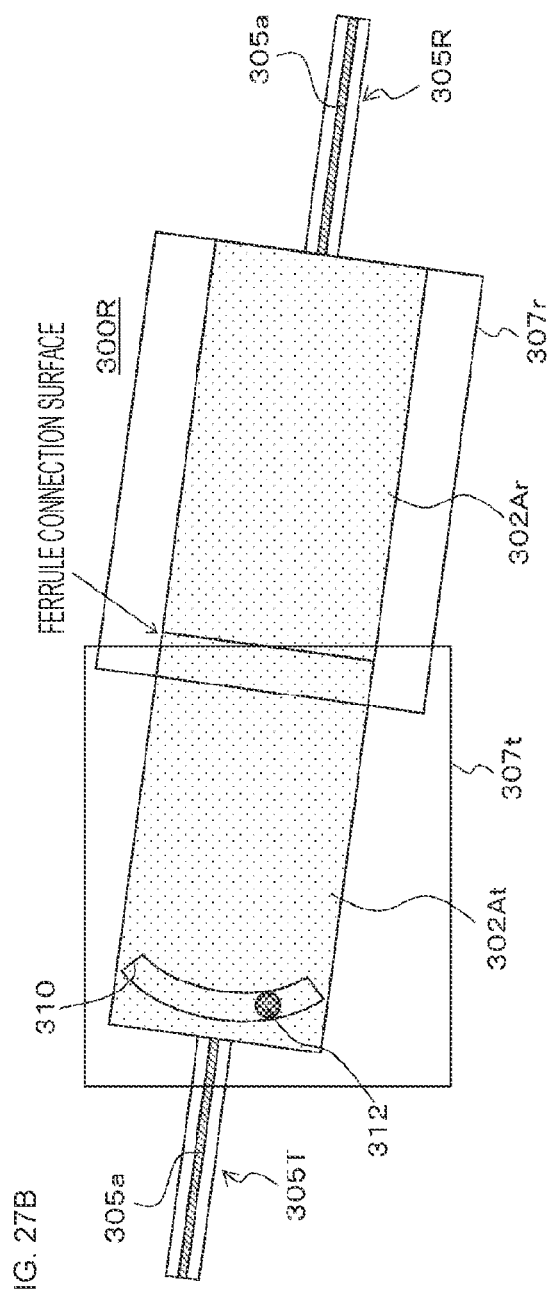
FIG. 27A
FIG. 27B

ABSTRACT# OPTICAL CONNECTOR, OPTICAL CABLE, AND ELECTRONIC DEVICE

CROSS REFERENCE TO RELATED APPLICATIONS

This application is a U.S. National Phase of International Patent Application No. PCT/JP2020/013494 filed on Mar. 25, 2020, which claims priority benefit of Japanese Patent Application No. JP 2019-075342 filed in the Japan Patent Office on Apr. 11, 2019. Each of the above-referenced applications is hereby incorporated herein by reference in its entirety.

TECHNICAL FIELD

The present technology relates to an optical connector, an optical cable, and an electronic device. Specifically, the present invention relates to an optical connector having a floating structure and the like.

BACKGROUND ART

Conventionally, an optical connector having a floating function has been proposed to enable favorable connection even in a case where prying by a user occurs (see, for example, Patent Document 1). The conventionally proposed optical connector has a structure in which a rear surface side of a ferrule is fixed to a connector housing through a coil spring.

By providing the coil spring, a connector body can follow a force of prying or the like by the user. Here, the longer the coil spring, the more the coil spring can follow, and the shorter the coil spring, the less the coil spring can follow. To maintain the floating function with respect to the amount of prying normally assumed for a consumer optical connector, it is necessary to provide a coil spring having a certain length. However, as the length of the coil spring becomes longer, the optical connector becomes longer in a depth direction, and has a structure not suitable for mounting on small devices such as consumer products.

CITATION LIST

Patent Document

Patent Document 1: Japanese Patent Application Laid-Open No. 2001-264589

SUMMARY OF THE INVENTION

Problems to be Solved by the Invention

An object of the present technology is to provide an optical connector capable of implementing a floating function while keeping a depth direction short.

Solutions to Problems

A concept of the present technology resides in
an optical connector including:
a connector body disposed inside a connector housing; and
a regulation portion that regulates a movable region on a rear surface side of the connector body, the movable region being in one direction orthogonal to a front-rear direction of the connector housing with respect to the connector housing.

In the present technology, the connector body and the regulation portion are provided. The connector body is disposed inside the connector housing. For example, the connector body may be a ferrule with a lens.

The regulation portion regulates the movable region on the rear surface side of the connector body, the movable region being in one direction orthogonal to the front-rear direction of the connector housing with respect to the connector housing. For example, the regulation portion may include a guiderail portion provided in the connector housing or the connector body.

In this manner, in the present technology, the movable region on the rear surface side of the connector body, the movable region being in one direction orthogonal to the front-rear direction of the connector housing with respect to the connector housing, is regulated. Therefore, it is possible to implement the floating function while keeping the depth direction short, and it is possible to provide the optical connector suitable for mounting on small devices such as consumer products.

Note that, in the present technology, the movable region may be an arc-shaped region having a center on a front surface side of the connector body, for example. By setting the movable region in this manner, the rear surface side of the connector body smoothly moves along the arc-shaped region, and the connector body can satisfactorily follow the force of prying or the like by the user.

Furthermore, in the present technology, for example, the movable region may be limited to a range in which the rear surface side of the connector body does not come into contact with the connector housing. By limiting the range of the movable region in this manner, it is possible to prevent a rear surface of the connector body from coming into contact with the connector housing and being damaged even in a case where the rear surface of the connector body is greatly moved along the arc-shaped region by the force of prying or the like by the user.

Furthermore, in the present technology, for example, a biasing portion that biases the connector body in a front direction of the connector housing may be further provided, and the regulation portion may further regulate a moving region of the connector body in the front-rear direction of the connector housing. As a result, a pushing back force is generated when the mating optical connector is connected to the connector body, and it is easy to maintain a correct connection state between the connector bodies.

In this case, for example, the regulation portion may have a groove portion for providing an initial position of the connector body on a front surface side of the connector housing. Since the regulation portion has the groove portion as described above, it is possible to stably hold the rear surface side of the connector body at the initial position in a state where the mating connector is not connected.

Furthermore, in this case, for example, the biasing portion may be formed using an elastic member that presses the connector body in the front direction of the connector housing. Here, the biasing portion may be leaf springs disposed on both sides in the one direction of the rear surface side of the connector housing. By disposing the leaf springs on both sides in the one direction of the rear surface side of the connector housing in this manner, in a case where the position on the rear surface side of the connector body moves from the center in the one direction, it is possible to press the connector body in the front direction of the connector housing while correcting the position on the rear surface side of the connector body to the center side in the one direction.

When the leaf springs are disposed on both sides in the one direction of the rear surface side of the connector housing as described above, for example, a leaf spring may be further provided, which is disposed on the rear surface side of the connector body and biases the connector body in the front direction of the connector housing. As a result, a pushing back force is further strongly generated when the mating optical connector is connected to the connector body, and it is easier to maintain a correct connection state between the connector bodies.

Furthermore, when the leaf springs are disposed on both sides in the one direction of the rear surface side of the connector housing as described above, for example, leaf springs may be further provided, which are disposed on both sides in another direction orthogonal to the one direction of the rear surface side of the connector housing. Thereby, in the case where the position on the rear surface side of the connector body moves from the center in the another direction, it is possible to press the connector body in the front direction of the connector housing while correcting the position on the rear surface side of the connector body to the center side in the another direction.

Furthermore, in the case where the biasing portion that biases the connector body in a front direction of the connector housing is provided, the biasing portion may be formed using an elastic member that pulls the connector body in the front direction of the connector housing. Here, the biasing portion is a resin member or a coil spring having elasticity and stretched between the connector housing and the connector body. By forming the biasing portion with the elastic member that pulls the connector body in the front direction of the connector housing in this manner, it is possible to avoid disposing the biasing portion on the rear surface side of the connector body and contribute to shortening the length in the depth direction.

Furthermore, in the present technology, for example, a holding portion having elasticity and which holds the connector body at an initial position may be further provided. In this case, for example, the holding portion may be a resin member or a spring member disposed between the connector body and the connector housing. By providing the holding portion having elasticity in this manner, it is possible to hold the connector body at the initial position in a state where the mating connector is not connected, without interfering with the followability to the force of prying or the like by the user.

Furthermore, another concept of the present technology resides in
an optical cable having an optical connector as a plug, the optical connector including:
a connector body disposed inside a connector housing; and
a regulation portion that regulates a movable region on a rear surface side of the connector body, the movable region being in one direction orthogonal to a front-rear direction of the connector housing with respect to the connector housing.

Furthermore, another concept of the present technology resides in
an electronic device having an optical connector as a receptacle, the optical connector including:
a connector body disposed inside a connector housing; and
a regulation portion that regulates a movable region on a rear surface side of the connector body, the movable region being in one direction orthogonal to a front-rear direction of the connector housing with respect to the connector housing.

BRIEF DESCRIPTION OF DRAWINGS

FIGS. 3A, 3B, and 3C are views illustrating an example in which an optical connector is configured using a ferrule with a lens.

FIGS. 4A and 4B are views for describing a connection state between the transmission-side optical connector and the reception-side optical connector.

FIGS. 6A, 6B, and 6C are views illustrating an example of a structure in which the ferrule is in the floating state in the transmission-side optical connector.

FIGS. 7A, 7B, 7C, and 7D are views illustrating a configuration example of a transmission-side optical connector as a first embodiment.

FIGS. 8A and 8B are views for describing a connection state between the transmission-side optical connector and a reception-side optical connector.

FIGS. 9A and 9B are views illustrating an example in which a length of a guiderail is adjusted so that a rear surface of a ferrule does not come into contact with a connector housing.

FIGS. 10A and 10B are views illustrating a configuration example of a transmission-side optical connector as a second embodiment.

FIGS. 11A, 11B, 11C, and 11D are views illustrating a configuration example of a transmission-side optical connector as a third embodiment.

FIGS. 12A and 12B are views for describing a connection state between the transmission-side optical connector and a reception-side optical connector.

FIGS. 13A and 13B are views for describing a connection state between the transmission-side optical connector and a reception-side optical connector.

FIGS. 14A, 14B, 14C, and 14D are views illustrating a configuration example of a transmission-side optical connector as a fourth embodiment.

FIGS. 15A and 15B are views for describing a connection state between the transmission-side optical connector and a reception-side optical connector.

FIGS. 16A and 16B are views illustrating a configuration example of a transmission-side optical connector as a fifth embodiment.

FIGS. 26A, 26B, 26C, and 26D are views illustrating a configuration example of a transmission-side optical connector as a tenth embodiment.

FIGS. 27A and 27B are views for describing a connection state between the transmission-side optical connector and a reception-side optical connector.

MODE FOR CARRYING OUT THE INVENTION

Hereinafter, a mode for implementing the present invention (hereinafter referred to as an "embodiment") will be described. Note that the description will be given in the following order.
1. Embodiment
2. Modification 1. Embodiment

[Configuration Example of Electronic Device and Optical Cable]

Figure 1:
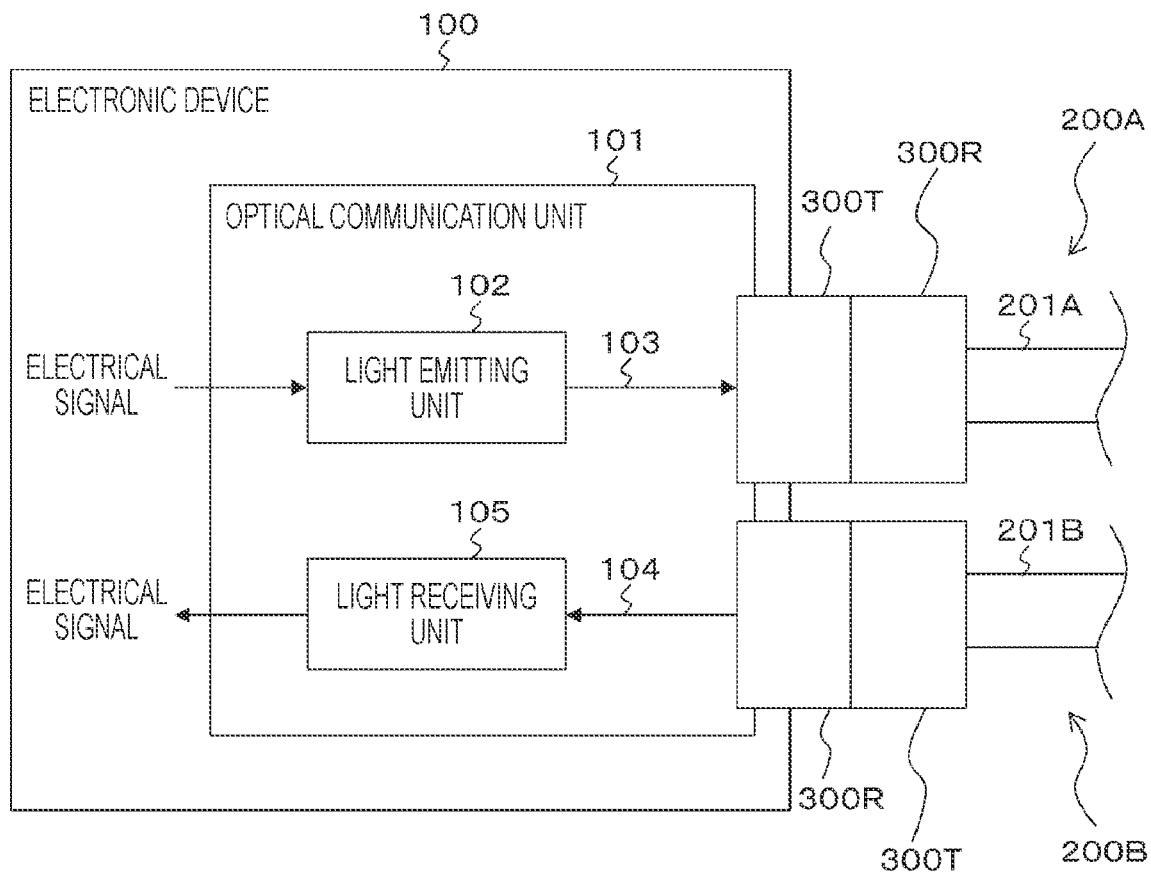
FIG. 1 is a diagram illustrating a configuration example of an electronic device and an optical cable as an embodiment.

FIG. 1 illustrates a configuration example of an electronic device 100 and optical cables 200A and 200B as an embodiment. The electronic device 100 includes an optical communication unit 101. The optical communication unit 101 includes a light emitting unit 102, an optical transmission line 103, a transmission-side optical connector 300T as a receptacle, a reception-side optical connector 300R as a receptacle, an optical transmission line 104, and a light receiving unit 105. Each of the optical transmission line 103 and the optical transmission line 104 can be implemented by an optical fiber.

The light emitting unit 102 includes a laser element such as a vertical cavity surface emitting laser (VCSEL) or a light emitting element such as a light emitting diode (LED). The light emitting unit 102 converts an electrical signal (transmission signal) generated by a transmission circuit (not illustrated) of the electronic device 100 into an optical signal. The optical signal emitted by the light emitting unit 102 is sent to the transmission-side optical connector 300T via the optical transmission line 103. Here, the light emitting unit 102, the optical transmission line 103, and the transmission-side optical connector 300T constitute an optical transmitter.

The optical signal received by the reception-side optical connector 300R is sent to the light receiving unit 105 via the optical transmission line 104. The light receiving unit 105 includes a light receiving element such as a photodiode. The light receiving unit 105 converts the optical signal transmitted from the reception-side optical connector 300R into an electrical signal (reception signal) and supplies the electrical signal to a reception circuit (not illustrated) of the electronic device 100. Here, the reception-side optical connector 300R, the optical transmission line 104, and the light receiving unit 105 constitute an optical receiver.

The optical cable 200A includes the reception-side optical connector 300R as a plug and a cable body 201A. The optical cable 200A transmits the optical signal from the electronic device 100 to another electronic device. The cable body 201A can be implemented by an optical fiber.

One end of the optical cable 200A is connected to the transmission-side optical connector 300T of the electronic device 100 by the reception-side optical connector 300R, and the other end of the optical cable 200A is connected to another electronic device (not illustrated). In this case, the transmission-side optical connector 300T and the reception-side optical connector 300R connected to each other constitute an optically coupled connector.

The optical cable 200B includes the transmission-side optical connector 300T as a plug and a cable body 201B. The optical cable 200B transmits the optical signal from another electronic device to the electronic device 100. The cable body 201B can be implemented by an optical fiber.

One end of the optical cable 200B is connected to the reception-side optical connector 300R of the electronic device 100 by the transmission-side optical connector 300T, and the other end of the optical cable 200B is connected to another electronic device (not illustrated). In this case, the transmission-side optical connector 300T and the reception-side optical connector 300R connected to each other constitute an optically coupled connector.

Note that the electronic device 100 can be, for example, a mobile electronic device such as a mobile phone, a smartphone, a PHS, a PDA, a tablet PC, a laptop computer, a video camera, an IC recorder, a portable media player, an electronic organizer, an electronic dictionary, a calculator, or a portable game machine, or another electronic device such as a desktop computer, a display device, a television receiver, a radio receiver, a video recorder, a printer, a car navigation system, a game machine, a router, a hub, or an optical network unit (ONU). Alternatively, the electronic device 100 can constitute a part or the whole of an electric product such as a refrigerator, a washing machine, a clock, an intercom, an air conditioning facility, a humidifier, an air purifier, a lighting fixture, or a cooking fixture, or a vehicle to be described below.

[Configuration Example of Optical Connector]

Figure 2:
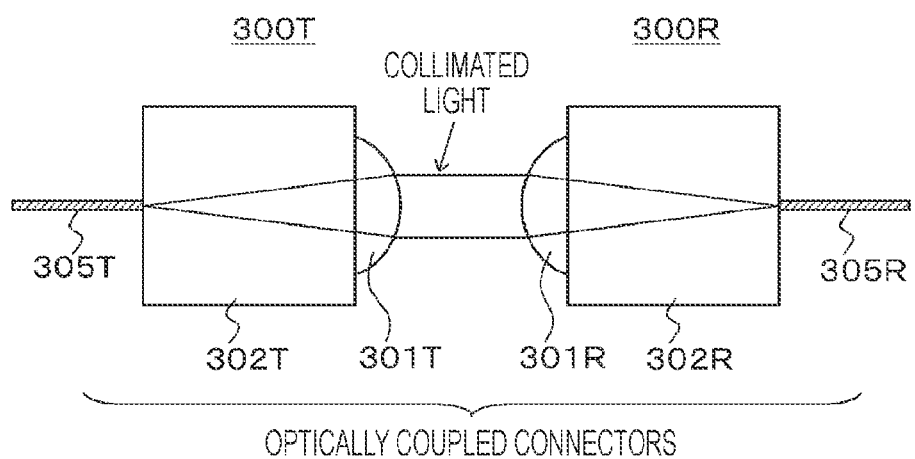
FIG. 2 is a view illustrating an outline of a transmission-side optical connector and a reception-side optical connector constituting an optically coupled connector.

FIG. 2 is a view illustrating an outline of the transmission-side optical connector 300T and the reception-side optical connector 300R constituting an optically coupled connector.

The transmission-side optical connector 300T includes a connector body 302T having a lens 301T. The reception-side optical connector 300R includes a connector body 302R having a lens 301R. When the transmission-side optical connector 300T and the reception-side optical connector 300R are connected, the lens 301T and the lens 301R face each other, and optical axes thereof coincide with each other, as illustrated in the drawing.

On the transmission-side, an optical fiber 305T is attached to the connector body 302T such that its emission end is located at a focal position on the optical axis of the lens 301T. Furthermore, on the reception side, an optical fiber 305R is attached to the connector body 302R such that its incident end is located at a focal position on the optical axis of the lens 301R.

Light emitted from the transmission-side optical fiber 305T is incident on the lens 301T via the connector body 302T, and light shaped into collimated light is emitted through the lens 301T. The light thus formed into collimated light is incident on the lens 301R and condensed, and is incident on the incident end of the reception-side optical fiber 305R via the connector body 302R. As a result, the light (optical signal) is transmitted from the transmission-side optical fiber 305T to the reception-side optical fiber 305R.

FIGS. 3A, 3B, and 3C illustrate an example in which the optical connector 300 (300T or 300R) is configured using a ferrule 302A with a lens. The ferrule 302A is formed using, for example, a light transmissive material such as synthetic resin or glass. FIG. 3A is a side view and FIG. 3B is a top view. Furthermore, FIG. 3C is a cross-sectional view taken along line A-B in FIG. 3B.

A lens (convex lens) 301A is integrally formed with the ferrule 302A to be located in a bottom portion of a concave light emitting portion (light transmission space) formed on a front surface side. Furthermore, an optical fiber insertion hole 303 extending forward from the rear surface side is formed in the ferrule 302A. Then, the optical fiber 305 is inserted and fixed into the optical fiber insertion hole 303. The optical fiber 305 has a double structure of a core 305a that is a center portion serving as an optical path and a clad 305b covering the core.

FIGS. 4A and 4B illustrate a connection state between the transmission-side optical connector 300T and the reception-side optical connector 300R. Here, the connector body of the transmission-side optical connector 300T includes a ferrule 302At with a lens. The ferrule 302At is fixed to the connector housing 307t by a fixing member 306t.

A lens (convex lens) 301At is integrally formed with the ferrule 302At to be located in a bottom portion of a concave light emitting portion (light transmission space) formed on a front surface side. Furthermore, an optical fiber insertion hole 303t extending forward from the rear surface side is formed in the ferrule 302At. Then, the optical fiber 305T is inserted and fixed into the optical fiber insertion hole 303t.

Furthermore, the connector body of the reception-side optical connector 300R includes a ferrule 302Ar with a lens. The ferrule 302Ar is fixed to the connector housing 307r by a fixing member 306r.

A lens (convex lens) 301Ar is integrally formed with the ferrule 302Ar to be located in a bottom portion of a concave light incident portion (light transmission space) formed on a front surface side. Furthermore, an optical fiber insertion hole 303r extending forward from the rear surface side is formed in the ferrule 302Ar. Then, the optical fiber 305R is inserted and fixed into the optical fiber insertion hole 303r.

When the transmission-side optical connector 300T and the reception-side optical connector 300R are connected, if ferrule connection surfaces are correctly connected as illustrated in FIG. 4A, the light (optical signal) is transmitted from the transmission-side optical fiber 305T to the reception-side optical fiber 305R without loss.

However, as described above, when the ferrules 302At and 302Ar are fixed to the connector housings 307t and 307r by the fixing members 306t and 306r, a gap is formed between the ferrule connection surfaces as illustrated in FIG. 4B in a case where the ferrule 302Ar of the reception-side optical connector 300R is connected at an oblique angle by a force of prying or the like. As a result, the light (optical signal) cannot be correctly transmitted from the transmission-side optical fiber 305T to the reception-side optical fiber 305R, loss occurs, and communication quality is significantly deteriorated.

Therefore, in the optical connector, it is conceivable that the ferrule is made in a floating state without being fixed to the connector housing.

Figure 5A:
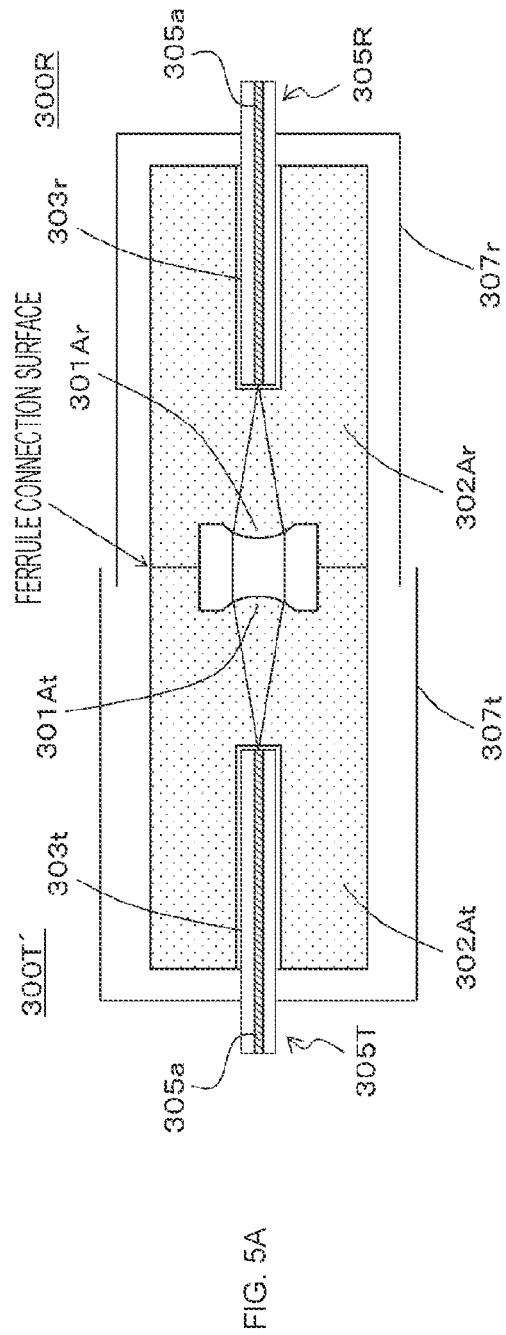
FIGS. 5A and 5B are views for describing a connection state between a transmission-side optical connector in which the ferrule is in a floating state and the reception-side optical connector.
Figure 5B:
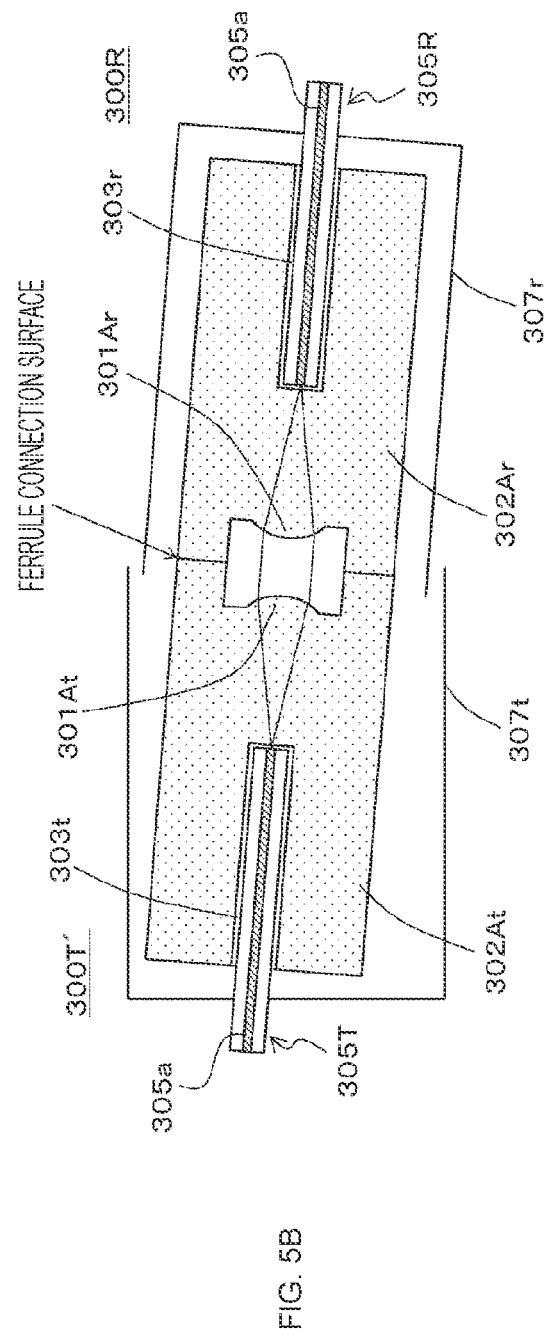

FIGS. 5A and 5B illustrate a connection state between a transmission-side optical connector 300T' and the reception-side optical connector 300R. In FIGS. 5A and 5B, a portion corresponding to that in FIGS. 4A and 4B is given the same reference numeral. Here, the transmission-side optical connector 300T' is configured similarly to the transmission-side optical connector 300T in FIGS. 4A and 4B except that the ferrule 302At is in a floating state. Furthermore, the reception-side optical connector 300R is configured similarly to the reception-side optical connector 300T in FIGS. 4A and 4B, but the fixing member 306r is not illustrated for simplification of drawing. This also similarly applies to the following drawings.

FIG. 5A illustrates a state in which, for example, the ferrule 302Ar of the reception-side optical connector 300R is connected at a vertical angle. FIG. 5B illustrates a state in which the ferrule 302Ar of the reception-side optical connector 300R is connected at an oblique angle by a force of prying or the like. Here, although not illustrated, the facing ferrules are fitted with uneven portions or pins. In this case, since the ferrule 302At of the transmission-side optical connector 300T' is in the floating state, the ferrule 302At follows the ferrule 302Ar of the reception-side optical connector 300R, and a state in which the ferrule connection surfaces are correctly connected is maintained.

By setting the ferrule of the optical connector in the floating state as described above, even when the ferrule of the mating optical connector is connected at an oblique angle by a force of prying or the like, the state in which the ferrule connection surfaces are correctly connected can be maintained.

Note that, although the example in which the ferrule of the transmission-side optical connector is in the floating state has been described, the ferrule of the reception-side optical connector may be made in the floating state or the ferrules of both of the optical connectors may be made in the floating state. Hereinafter, an example in which the ferrule of the transmission-side optical connector is made in the floating state will be described.

FIGS. 6A, 6B, and 6C illustrate an example of a structure in which the ferrule 302At is made in the floating state in the transmission-side optical connector 300T'. In FIGS. 6A, 6B, and 6C, a portion corresponding to that in FIGS. 5A and 5B is given the same reference numeral. FIG. 6A is a side view and FIG. 6B is a top view. FIG. 6C illustrates a connection state between the transmission-side optical connector 300T' and the reception-side optical connector 300R.

The rear surface side of the ferrule 302At is connected to the connector housing 307t via coil springs 308. Since the ferrule 302At is not connected to any member other than the coil springs 308, the ferrule is in the floating state.

Here, as illustrated, the coil springs 308 are generally placed between the ferrule 302At and a side opposite to a connection end surface side (front surface side) of the connector housing 307t. As a result, when the ferrule 302Ar of the reception-side optical connector 300R is inserted into the connector housing 307t of the transmission-side optical connector 300T' as illustrated in FIG. 6C, the coil springs 308 contract to generate a force pushing back against the ferrule 302Ar, and the ferrule connection surfaces can be easily maintained in a correct connection state.

By providing the coil springs 308 in this manner, the coil springs 308 can follow the force of prying or the like. The longer the coil springs 308, the more the coil springs 308 can follow the force, and the shorter the coil springs 308, the less amount the coil springs 308 can follow the force. Therefore, to maintain the floating state with respect to the amount of prying normally assumed for a consumer connector, the coil springs 308 need to have a certain length, and the depth direction of the connector becomes longer accordingly, so that a structure that is not suitable for mounting on small devices such as consumer products is obtained.

By using the present technology, it is possible to shorten the connector in the depth direction as compared with use of the coil spring while maintaining the floating structure of the ferrule as the connector body. Hereinafter, an optical connector as an embodiment will be described.

First Embodiment

FIGS. 7A, 7B, 7C, and 7D illustrate a configuration example of a transmission-side optical connector 300T-1 as a first embodiment. In FIGS. 7A, 7B, 7C, and 7D, a part corresponding to that in FIGS. 5A and 5B is given the same reference numeral, and detailed description thereof is appropriately omitted. FIG. 7A is a side view, FIG. 7B is a view in which members 309 with a guiderail are removed from the side view, FIG. 7C is a top view, and FIG. 7D is a rear view as viewed from an optical fiber insertion side.

The members 309 with a guiderail are arranged and fixed on both the right and left sides in the rear-side inside of the connector housing 307*t*. A guiderail 310 extending in one direction (up-down direction) orthogonal to a front-rear direction of the connector housing 307*t* is bored in the member 309 with a guiderail. The guiderail 310 is an arc-shaped hole centered on the front surface side of the ferrule 302At.

Furthermore, a rectangular frame-shaped shaft member 311 is fixed to the rear surface side of the ferrule 302At by, for example, adhesion. Shafts 312 having a circular cross section are planted on both the right and left sides of the shaft member 311. The right and left shafts 312 are inserted into the guiderails 310 of the members 309 with a guiderail.

As described above, the right and left shafts 312 on the rear surface side of the ferrule 302At are disposed in the state of penetrating the guiderails 310. As a result, the ferrule 302At is not fixed to the connector housing 307*t* but is in a floating state. In this case, the rear surface side of the ferrule 302At moves as the shafts 312 moves along the guiderails 310. A movable region on the rear surface side of the ferrule 302At is regulated by the guiderails 310.

As described above, since the guiderail 310 is an arc-shaped hole centered on the front surface side of the ferrule 302At, the movable region on the rear surface side of the ferrule 302At is the arc-shaped region. As a result, the rear surface side of the ferrule 302At smoothly moves along the arc-shaped region, and the ferrule 302At can satisfactorily follow the force of prying or the like by the user Furthermore, the guiderails 310 constitute a regulation portion that regulates the movable region on the rear surface side of the ferrule 302At, and limits a range of the movable region on the rear surface side of the ferrule 302At to a range not coming into contact with the connector housing 307*t*. By limiting the range of the movable region in this manner, it is possible to prevent the rear surface of the ferrule 302At from coming into contact with the connector housing 307*t* and being damaged even in a case where the rear surface of the ferrule 302At largely moves along the arc-shaped region by the force of prying or the like by the user.

FIGS. 8A and 8B illustrate a connection state between the transmission-side optical connector 300T-1 and the reception-side optical connector 300R. In FIGS. 8A and 8B, a portion corresponding to that in FIG. 5A, 5B, or 7A, 7B, 7C, and 7D is given the same reference numeral.

FIG. 8A illustrates a state in which the ferrule 302Ar of the reception-side optical connector 300R is connected at a vertical angle. FIG. 8B illustrates a state in which the ferrule 302Ar of the reception-side optical connector 300R is connected at an oblique angle by a force of prying or the like. In this case, since the ferrule 302At of the transmission-side optical connector 300T-1 is in the floating state, the ferrule 302At follows the ferrule 302Ar of the reception-side optical connector 300R, and a state in which ferrule connection surfaces are correctly connected is maintained.

FIGS. 9A and 9B are views illustrating an example in which the length of the guiderails 310 is adjusted so that the rear surface of the ferrule 302At does not come into contact with the connector housing 307*t*. FIG. 9A illustrates the member 309 with a guiderail as it is, but FIG. 9B illustrates a state in which the member 309 with a guiderail is removed. In this case, a movable amount of the rear surface of the ferrule 302At is limited as the shaft 312 abuts on an end of the guiderail 310, and the rear surface of the ferrule 302At is prevented from coming into contact with the connector housing 307*t*.

As described above, in the transmission-side optical connector 300T-1 illustrated in FIGS. 7A, 7B, 7C, and 7D, the rear surface side of the ferrule 302At is movable in the up-down direction, and the movable region is regulated by the guiderails 310. Therefore, it is possible to implement a floating function while keeping a depth direction short, and it is possible to provide the optical connector suitable for mounting on small devices such as consumer products.

Second Embodiment

FIGS. 10A and 10B illustrate a configuration example of a transmission-side optical connector 300T-2 as a second embodiment. In FIGS. 10A and 10B, a part corresponding to that in FIGS. 7A, 7B, 70, 7D, 8A, and 8B is given the same reference numeral, and detailed description thereof is appropriately omitted. Note that, in a reception-side optical connector 300R, illustration of a fixing member 306*r* and a connector housing 307*r* is omitted for simplification of drawing. This also similarly applies to the following drawings.

A transmission-side optical connector 300T-2 includes ferrule initial position adjustment springs 313. The ferrule initial position adjustment springs 313 are disposed on both the upper and lower sides of a ferrule 302At between the ferrule 302At and a connector housing 307*t*. The ferrule initial position adjustment springs 313 constitute a holding portion having elasticity for holding the ferrule 302At at an initial position.

The rest of the transmission-side optical connector 300T-2 is configured similarly to the transmission-side optical connector 300T-1 illustrated in FIGS. 7A, 7B, 7C, and 7D.

By providing the ferrule initial position adjustment springs 313 in this manner, it is possible to adjust the position of the ferrule 302At with respect to the connector housing 307*t* while maintaining a floating state of the ferrule 302At. Therefore, due to a spring effect of the ferrule initial position adjustment springs 313, the floating state can be maintained even in a state where the reception-side optical connector 300R is not connected and the initial position can be further determined.

FIG. 10A illustrates a state in which the ferrule 302Ar of the reception-side optical connector 300R is connected at a vertical angle. In this state, the ferrule 302At is placed at the initial position due to the spring effect of the ferrule initial position adjustment springs 313. FIG. 10B illustrates a state in which the ferrule 302Ar of the reception-side optical connector 300R is connected at an oblique angle by a force of prying or the like. In this case, the ferrule initial position adjustment springs 313 are deformed, but in a case where a stress that causes prying of the reception-side optical connector 300R is released thereafter, the ferrule 302At moves so as to be settled at the initial position as illustrated in FIG. 10A due to the spring effect of the ferrule initial position adjustment springs 313.

Third Embodiment

FIGS. 11A, 11B, 11C, and 11D illustrate a configuration example of a transmission-side optical connector 300T-3 as a third embodiment. In FIGS. 11A, 11B, 11C, and 11D, a part corresponding to that in FIGS. 7A, 7B, 7C, 7D, 8A, and 8B is given the same reference numeral, and detailed description thereof is appropriately omitted. FIG. 11A is a side view, FIG. 11B is a view in which members 309 with a guiderail are removed from the side view, FIG. 11C is a top view, and FIG. 11D is a rear view as viewed from an optical fiber insertion side.

Leaf springs 314 are disposed and fixed on both the upper and lower sides in the rear-side inside of a connector housing 307t of the transmission-side optical connector 300T-3. The leaf springs 314 constitute a biasing portion that biases a ferrule 302At in a front direction of the connector housing 307t. Furthermore, the leaf springs 314 constitute an elastic member that presses the ferrule 302At in the front direction of the connector housing 307t. Note that the elastic member is not limited to the leaf springs 314 but will be described here as the leaf springs 314.

A guiderail 310A bored in the member 309 with a guiderail regulates a movable region in an up-down direction on a rear surface side of the ferrule 302At and regulates a moving region in a front-rear direction of the ferrule 302At, similarly to the guiderail 310 illustrated in FIGS. 7A, 7B, 7C, and 7D. Therefore, a rear-side side of the guiderail 310A is formed in an arc shape extending in the up-down direction similarly to the guiderail 310, but a front-side side of the guiderail 310A is formed in a linear shape extending in the up-down direction.

In this case, for example, when the ferrule 302At is pressed toward the rear surface side of the connector housing 307t against a biasing force of the leaf springs 314 by a pressing force from the reception-side optical connector 300R when the connectors are fitted, shafts 312 come into contact with the rear-side side of the guiderail 310A and movement of the rear surface side of the ferrule 302At is regulated. On the other hand, in a case where the ferrule 302At is not pressed as described above, the shafts 312 come into contact with the front-side side the guiderail 310A, and the movement of the rear surface side of the ferrule 302At is regulated (see FIGS. 11A and 11B).

Furthermore, the transmission-side optical connector 300T-3 includes support members 315 for supporting the ferrule 302At. The material of the instruction members 315 is not limited, but for example, an elastic member that can be somewhat deformed by a force of prying to be described later, like a resin member, is favorable. The support members 315 are provided on both the up and down sides on a front surface of the connector housing 307t between the connector housing 307t and the ferrule 302At. The support members 315 constitute a holding portion having elasticity for holding the ferrule 302At at an initial position. The ferrule 302At is stably held at the initial position by the support members 315.

The rest of the transmission-side optical connector 300T-3 is configured similarly to the transmission-side optical connector 300T-1 illustrated in FIGS. 7A, 7B, 7C, and 7D.

FIGS. 12A and 12B illustrate a state in which the ferrule 302At is pressed toward the rear surface side of the connector housing 307t against the biasing force of the leaf springs 314 by the ferrule 302Ar of the reception-side optical connector 300R in a state in which the ferrule 302Ar of the reception-side optical connector 300R is connected at a vertical angle. Note that FIG. 12A is a view in which the member 309 with a guiderail is attached, but FIG. 12B is a view in which the member 309 with a guiderail is removed so that the state of the leaf springs 314 can be understood. In this state, the shafts 312 are in contact with the rear-side side of the guiderail 310A on the rear surface side of the ferrule 302At, and the movement in the rear direction with respect to the connector housing 307t is regulated.

In this case, since the front surface side of the ferrule 302At is supported by the support members 315, when the reception-side optical connector 300R is inserted, ferrule end surfaces of both the connectors can be easily aligned. Then, in this case, the reception-side optical connector 300R can be fitted by forming, for example, grooves so as not to interfere with the support members 315.

FIGS. 13A and 13B illustrates a state in which the ferrule 302Ar of the reception-side optical connector 300R is connected at an oblique angle by a force of prying or the like. Note that FIG. 13A is a view in which the member 309 with a guiderail is attached, but FIG. 13B is a view in which the member 309 with a guiderail is removed so that the state of the leaf springs 314 can be understood.

In this case, since the ferrule 302At of the transmission-side optical connector 300T-3 is in the floating state, the ferrule 302At follows the ferrule 302Ar of the reception-side optical connector 300R even if the ferrule 302Ar is inclined, and a state in which ferrule connection surfaces are correctly connected is maintained. At this time, when the support members 315 interfere with the ferrule 302At or the ferrule 302Ar of the reception-side optical connector 300R, the degree of interference can be reduced by using soft members as the support members 315.

Furthermore, in this state, in a case where the pressing of the ferrule 302Ar of the reception-side optical connector 300R is released, the ferrule 302At is pressed in the front direction of the connector housing 307t while correcting the position on the rear surface side of the ferrule 302At to a center side in the up-down direction (see FIGS. 12A and 12B) by the spring force (biasing force) of the leaf springs 314 arranged on both the upper and lower sides. Therefore, the ferrule 302At finally moves to be settled at the initial position as illustrated in FIGS. 11A and 11B.

As described above, in the transmission-side optical connector 300T-3 illustrated in FIGS. 11A, 11B, 11C, and 11D, the leaf springs 314 are arranged and fixed on both the upper and lower sides in the rear-side inside of the connector housing 307t, and the ferrule 302At is biased in the front direction of the connector housing 307t. Therefore, a pushing back force is generated when the ferrule 302At is connected with the ferrule 302Ar of the reception-side optical connector 300R, and a correct connection state can be easily maintained between the ferrules.

Fourth Embodiment

FIGS. 14A, 14B, 14C, and 14D illustrates a configuration example of a transmission-side optical connector 300T-4 as a fourth embodiment. In FIGS. 14A, 14B, 14C, and 14D, a part corresponding to that in FIGS. 11A, 11B, 11C, and 11D is given the same reference numeral, and detailed description thereof is appropriately omitted. FIG. 14A is a side view, FIG. 14B is a view in which members 309 with a guiderail are removed from the side view, FIG. 14C is a top view, and FIG. 14D is a rear view as viewed from an optical fiber insertion side.

A guiderail 310B bored in the member 309 with a guiderail regulates a movable region in an up-down direction on a rear surface side of a ferrule 302At and regulates a moving region in a front-rear direction of the ferrule 302At, similarly to the guiderail 310A illustrated in FIGS. 11A, 11B, 11C, and 11D. A rear-side side of the guiderail 310B is formed in an arc shape extending in the up-down direction similarly to the guiderail 310, but a front-side side of the guiderail 310B is not formed in a linear shape extending in the up-down direction and is formed in a curved shape in which a groove portion 310a is formed in a center portion. The groove portion 310a determines an initial position on a rear surface side of the ferrule 302At in a state where a reception-side optical connector 300R is not connected.

The rest of the transmission-side optical connector 300T-4 is configured similarly to the transmission-side optical connector 300T-3 illustrated in FIGS. 11A, 11B, 11C, and 11D.

FIG. 15A illustrates a state in which the ferrule 302At is pressed toward a rear surface side of a connector housing 307t against a pressing force of leaf springs 314 by the ferrule 302Ar of the reception-side optical connector 300R in a state in which the ferrule 302Ar of the reception-side optical connector 300R is connected at a vertical angle. FIG. 15B illustrates a state in which the ferrule 302Ar of the reception-side optical connector 300R is connected at an oblique angle by a force of prying or the like. Even in this case, the ferrule 302At is pressed toward the rear surface side of the connector housing 307t against the pressing force of the leaf springs 314 by the ferrule 302Ar of the reception-side optical connector 300R.

Since the groove portion 310a is formed in the center portion of the front-side side of the guiderail 310B in this manner, when the ferrule 302At is pressed in the front direction of the connector housing 307t by the spring plates 314, a shaft 312 is fitted in the groove 310a. Therefore, in a state where the reception-side optical connector 300R is not connected, the rear surface side of the ferrule 302At is stably held at the position of the groove portion 310a, that is, at the initial position.

Fifth Embodiment

Figure 17:
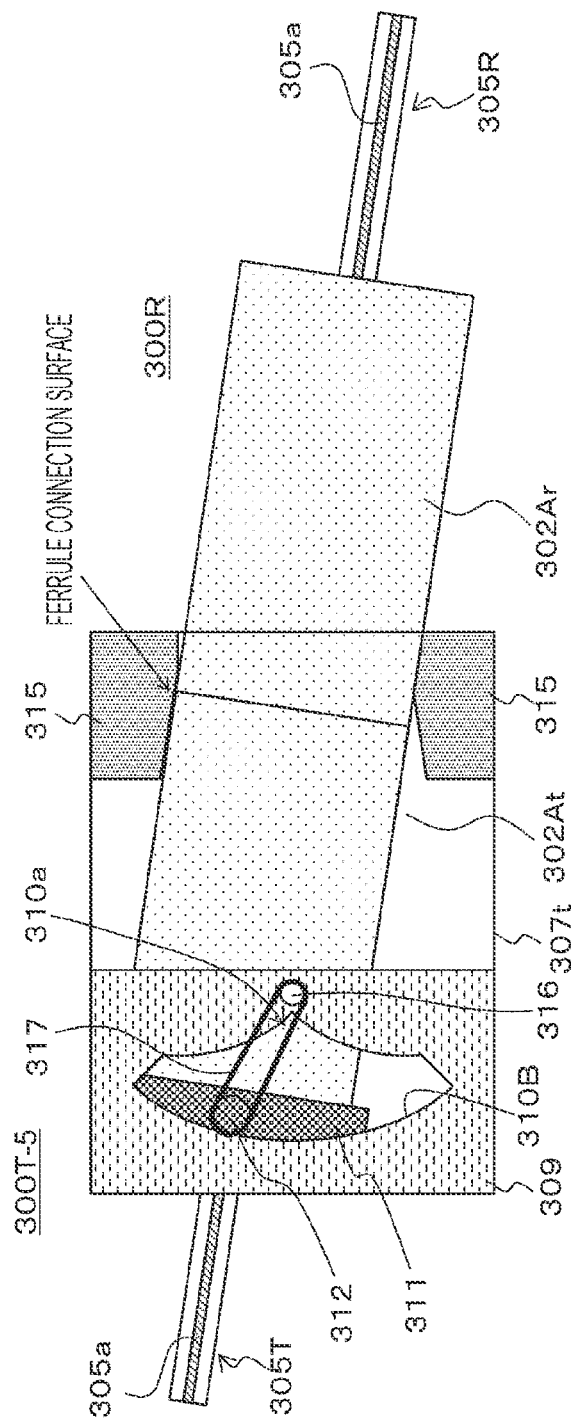
FIG. 17 is a view illustrating a configuration example of the transmission-side optical connector as the fifth embodiment.

FIGS. 16A, 16B, and 17 illustrate a configuration example of a transmission-side optical connector 300T-5 as a fifth embodiment. In FIGS. 16A, 16B, and 17, a part corresponding to that in FIGS. 14A, 14B, 14C, 14D, 15A, and 15B is given the same reference numeral, and detailed description thereof is appropriately omitted.

Pins 316 are planted at positions shifted forward from positions of groove portions 310a of the guiderails 310B of members 309 with a guiderail in two places in a right-left direction (only one of the two places is illustrated in the drawings). Although it is conceivable to integrally provide protrusions with the members 309 with a guiderail instead of planting the pins 316, description will be given here assuming that the pins 316 are planted.

A position adjustment ring 317 formed using, for example, a stretchable resin is bridged between a shaft 312 and the pin 316. The position adjustment rings 317 constitute a biasing portion that biases a ferrule 302At in a front direction of a connector housing 307t. Furthermore, the position adjustment rings 317 constitute an elastic member that pulls the ferrule 302At in the front direction of the connector housing 307t.

The rest of the transmission-side optical connector 300T-5 is configured similarly to the transmission-side optical connector 300T-4 illustrated in FIGS. 14A, 14B, 14C, and 14D.

FIG. 16A illustrates a state before a reception-side optical connector 300R is connected. FIG. 16B illustrates a state in which the ferrule 302At is pressed toward a rear surface side of the connector housing 307t against a tensile force of the position adjustment rings 317 by a ferrule 302Ar of the reception-side optical connector 300R in a state in which the ferrule 302Ar of the reception-side optical connector 300R is connected at a vertical angle.

FIG. 17 illustrates a state in which the ferrule 302Ar of the reception-side optical connector 300R is connected at an oblique angle by a force of prying or the like. Even in this case, the ferrule 302At is pressed toward the rear surface side of the connector housing 307t against the tensile force of the position adjustment rings 317 by the ferrule 302Ar of the reception-side optical connector 300R.

As described above, in the transmission-side optical connector 300T-5 illustrated in FIGS. 16A, 16B, and 17, the position adjustment ring 317 formed using a stretchable resin is bridged between the shaft 312 and the pin 316, and the ferrule 302At is biased in the front direction of the connector housing 307t. Therefore, a pushing back force is generated when the ferrule 302At is connected with the ferrule 302Ar of the reception-side optical connector 300R, and a correct connection state can be easily maintained between the ferrules.

Sixth Embodiment

Figure 18:
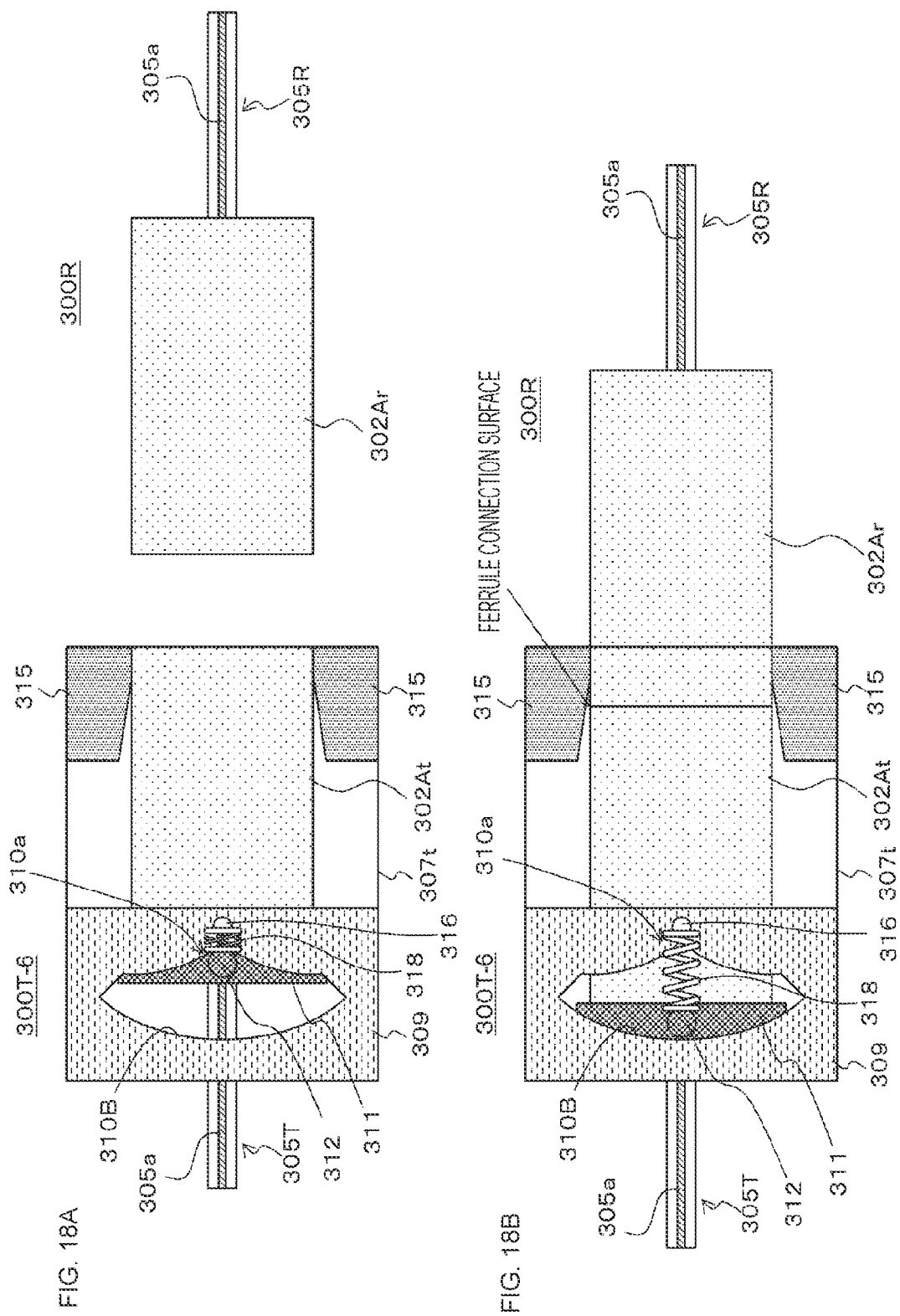
FIGS. 18A and 18B are views illustrating a configuration example of a transmission-side optical connector as a sixth embodiment.
Figure 19:
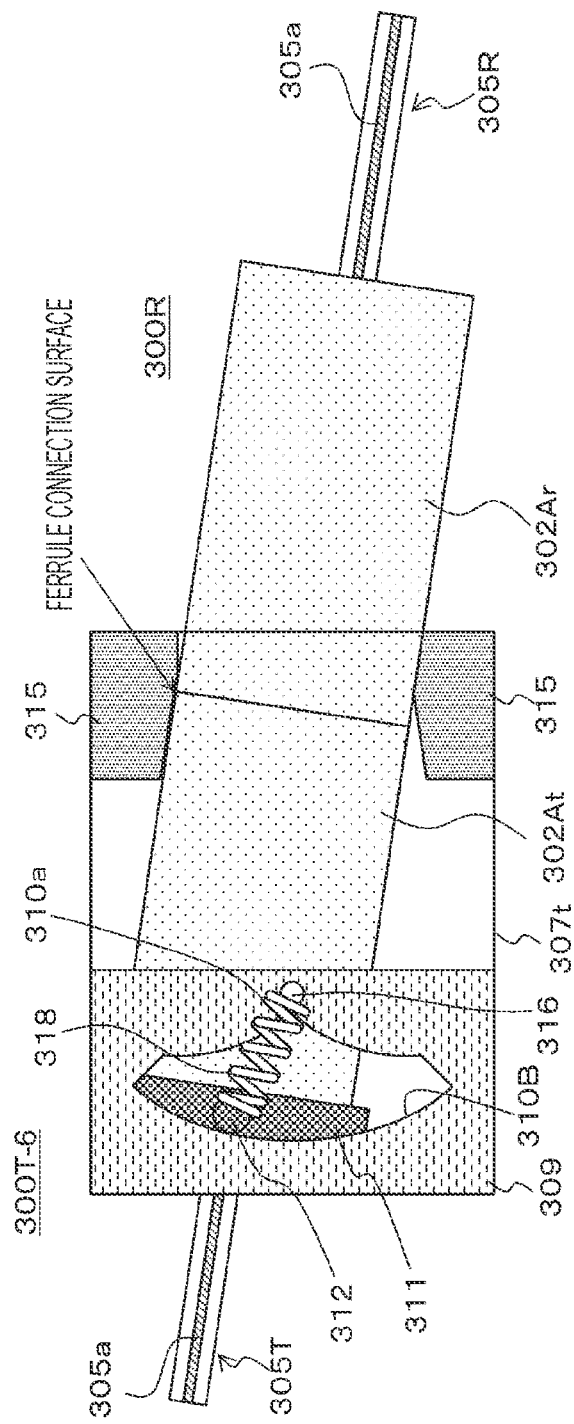
FIG. 19 is a view illustrating a configuration example of the transmission-side optical connector as the sixth embodiment.

FIGS. 18A, 18B, and 19 illustrate a configuration example of a transmission-side optical connector 300T-6 as a sixth embodiment. In FIGS. 18A, 18B, and 19, a part corresponding to that in FIGS. 16A, 16B, and 17 is given the same reference numeral, and detailed description thereof is appropriately omitted.

In the transmission-side optical connector 300T-6, a position adjustment spring (compression coil spring) 318 is bridged between a shaft 312 and a pin 316, instead of the position adjustment ring 317 of the transmission-side optical connector 300T-5 illustrated in FIGS. 16A, 16B, and 17. The position adjustment springs 318 constitute a biasing portion that biases a ferrule 302At in a front direction of a connector housing 307t, similarly to the position adjustment rings 317. Furthermore, the position adjustment springs 318 constitute an elastic member that pulls the ferrule 302At in the front direction of the connector housing 307t, similarly to the position adjustment rings 317.

The rest of the transmission-side optical connector 300T-6 is configured similarly to the transmission-side optical connector 300T-5 illustrated in FIGS. 16A, 16B, and 17.

FIG. 18A illustrates a state before a reception-side optical connector 300R is connected. FIG. 18B illustrates a state in which the ferrule 302At is pressed toward a rear surface side of the connector housing 307t against a tensile force of the position adjustment springs 318 by a ferrule 302Ar of the reception-side optical connector 300R in a state in which the ferrule 302Ar of the reception-side optical connector 300R is connected at a vertical angle.

FIG. 19 illustrates a state in which the ferrule 302Ar of the reception-side optical connector 300R is connected at an oblique angle by a force of prying or the like. Even in this case, the ferrule 302At is pressed toward the rear surface side of the connector housing 307t against the tensile force of the position adjustment springs 318 by the ferrule 302Ar of the reception-side optical connector 300R.

As described above, in the transmission-side optical connector 300T-6 illustrated in FIGS. 18A, 18B, and 19, the position adjustment spring 318 is bridged between the shaft 312 and the pin 316, and the ferrule 302At is biased in the front direction of the connector housing 307t. Therefore, a pushing back force is generated when the ferrule 302At is connected with the ferrule 302Ar of the reception-side optical connector 300R, and a correct connection state can be easily maintained between the ferrules.

Seventh Embodiment

Figure 20:
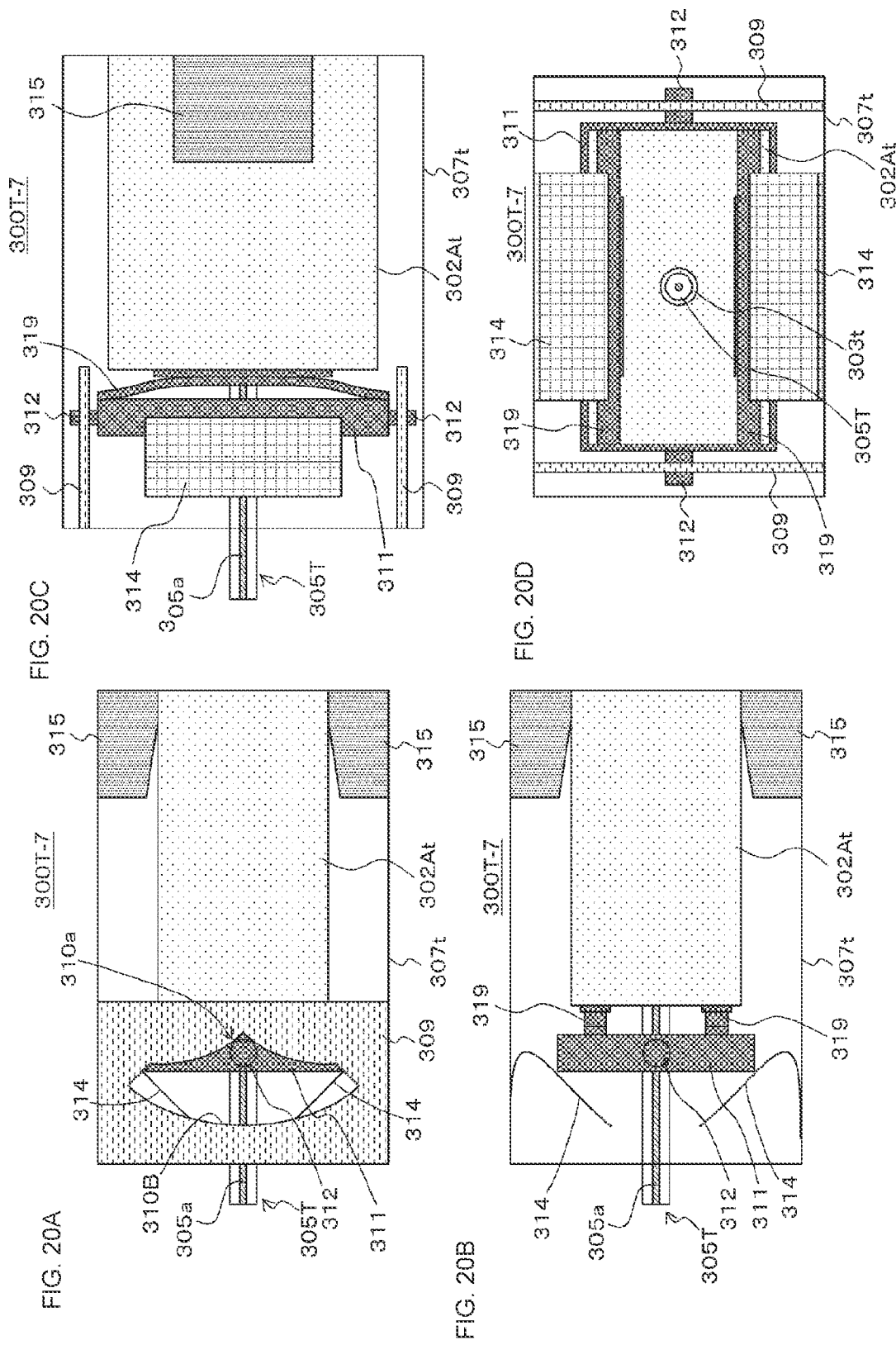
FIGS. 20A, 20B, 20C, and 20D are views illustrating a configuration example of a transmission-side optical connector as a seventh embodiment.

FIGS. 20A, 20B, 20C, and 20D illustrate a configuration example of a transmission-side optical connector 300T-7 as a seventh embodiment. In FIGS. 20A, 20B, 20C, and 20D, a part corresponding to that in FIGS. 14A, 14B, 14C, and 14D is given the same reference numeral, and detailed description thereof is appropriately omitted. FIG. 20A is a side view, FIG. 20B is a view in which members 309 with a guiderail are removed from the side view, FIG. 20C is a top view, and FIG. 20D is a rear view as viewed from an optical fiber insertion side.

In the transmission-side optical connector 300T-7, a shaft member 311 is not directly fixed to a rear surface side of a ferrule 302At, but is fixed via a leaf spring 319. The leaf spring 319 biases the ferrule 302At in a front direction of a connector housing 307t. Furthermore, in this case, leaf springs 314 are located between a rear surface of the connector housing 307t and the shaft member 311.

The rest of the transmission-side optical connector 300T-7 is configured similarly to the transmission-side optical connector 300T-4 illustrated in FIGS. 14A, 14B, 14C, and 14D.

Figure 21:
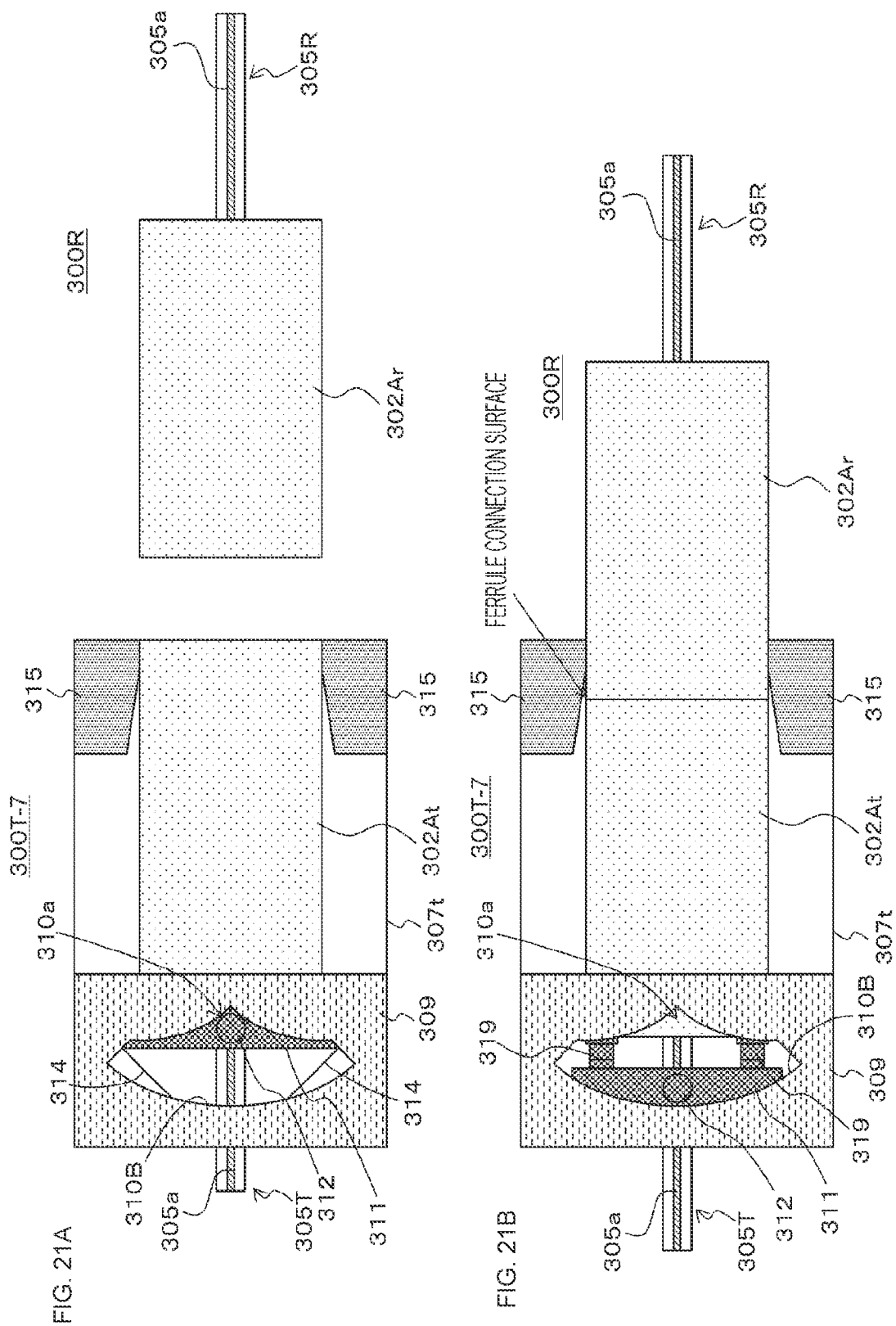
FIGS. 21A and 21B are views for describing a connection state between the transmission-side optical connector and a reception-side optical connector.

FIG. 21A illustrates a state before a reception-side optical connector 300R is connected. FIG. 21A illustrates a state in which the ferrule 302At is pressed toward the rear surface side of the connector housing 307t against a pressing force of the leaf springs 314 and the leaf spring 319 by a ferrule 302Ar of the reception-side optical connector 300R in a state in which the ferrule 302Ar of the reception-side optical connector 300R is connected at a vertical angle.

As described above, in the transmission-side optical connector 300T-7 illustrated in FIGS. 20A, 20B, 20C, and 20D, the shaft member 311 is fixed to the rear surface side of the ferrule 302At via the leaf spring 319, the ferrule 302At is strongly biased in the front direction of the connector housing 307t, a pushing back force is more strongly generated when the ferrule 302At is connected with the ferrule 302Ar of the reception-side optical connector 300R, and ferrule connection surfaces can be easily maintained in a correct connection state.

Eighth Embodiment

As described above, it is possible to generate a force pushing back a ferrule 302Ar of a reception-side optical connector 300R, but the reception-side optical connector 300R needs a force for not being pushed back against the force in order to maintain a connection state of ferrule connection surfaces.

Here, by fixing the reception-side optical connector 300R to a transmission-side optical connector with a lock or the like, the force for not being pushed back can be generated.

At this time, both the connectors can further push each other by the reception-side optical connector 300R similarly having a leaf spring structure. However, it is not necessary that both have a floating structure in order to follow a deviation due to prying or the like, and it is possible to follow the deviation if only one of the connectors has the floating structure. Therefore, the reception-side optical connector 300R does not need to have the floating structure, that is, the ferrule 302Ar may be fixed to a connector housing 307r.

Figure 22:
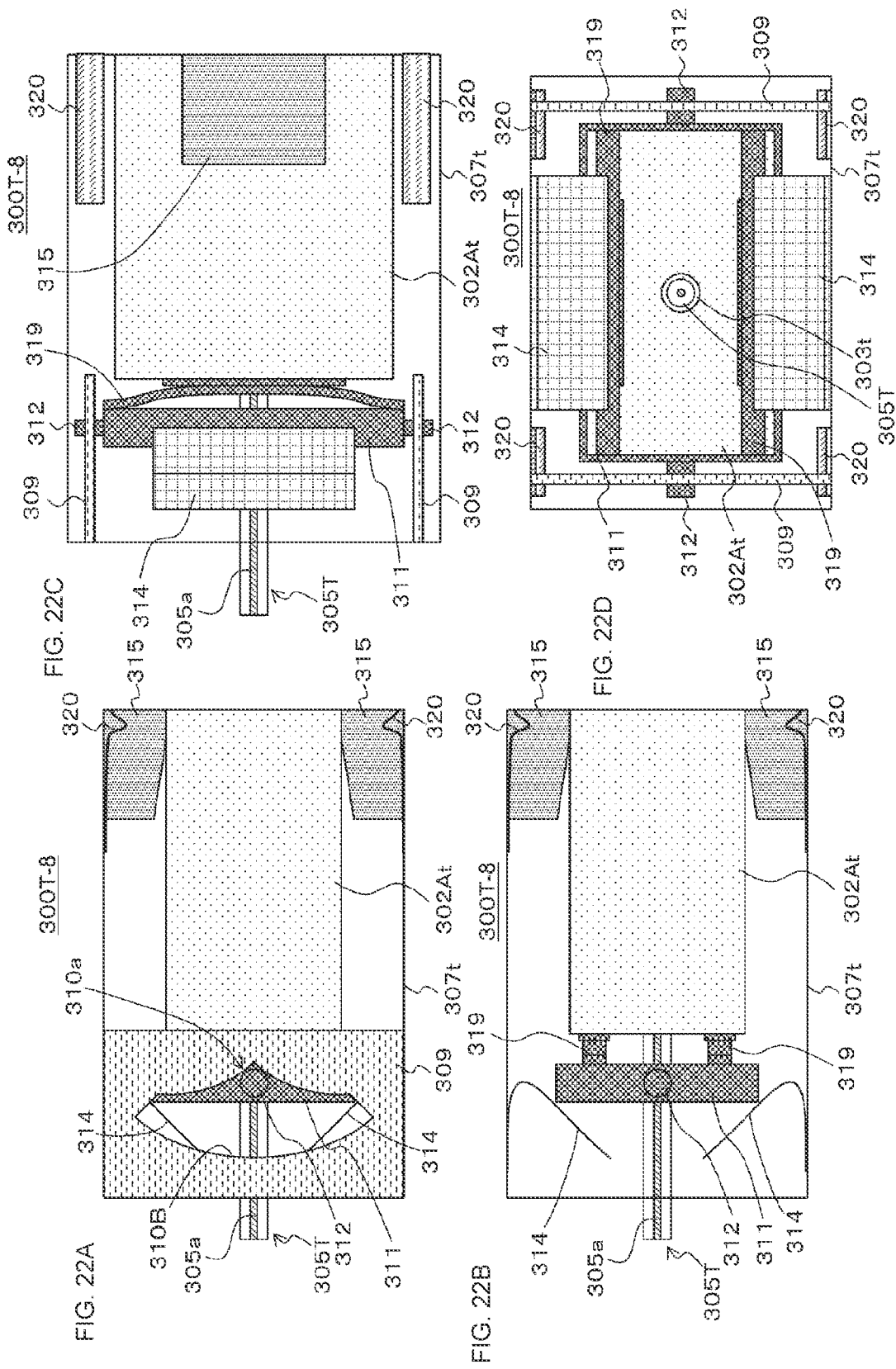
FIGS. 22A, 22B, 22C, and 22D are views illustrating a configuration example of a transmission-side optical connector as an eighth embodiment.

FIGS. 22A, 22B, 22C, and 22D illustrates a configuration example of a transmission-side optical connector 300T-8 as an eighth embodiment. In FIGS. 22A, 22B, 22C, and 22D, a part corresponding to that in FIGS. 20A, 20B, 20C, and 20D is given the same reference numeral, and detailed description thereof is appropriately omitted. FIG. 22A is a side view, FIG. 22B is a view in which members 309 with a guiderail are removed from the side view, FIG. 22C is a top view, and FIG. 22D is a rear view as viewed from an optical fiber insertion side.

In the transmission-side optical connector 300T-8, a lock portion 320 is provided on a front surface side of a connector housing 307t. The lock portion 320 is fixed at a position not interfering with a support member 315. The lock portion 320 is configured using, for example, a leaf spring having a protrusion (hook) on a distal end side, and has a structure in which a proximal end side is fixed to the connector housing 307t.

The rest of the transmission-side optical connector 300T-8 is configured similarly to the transmission-side optical connector 300T-7 illustrated in FIGS. 20A, 20B, 20C, and 20D.

Figure 23:
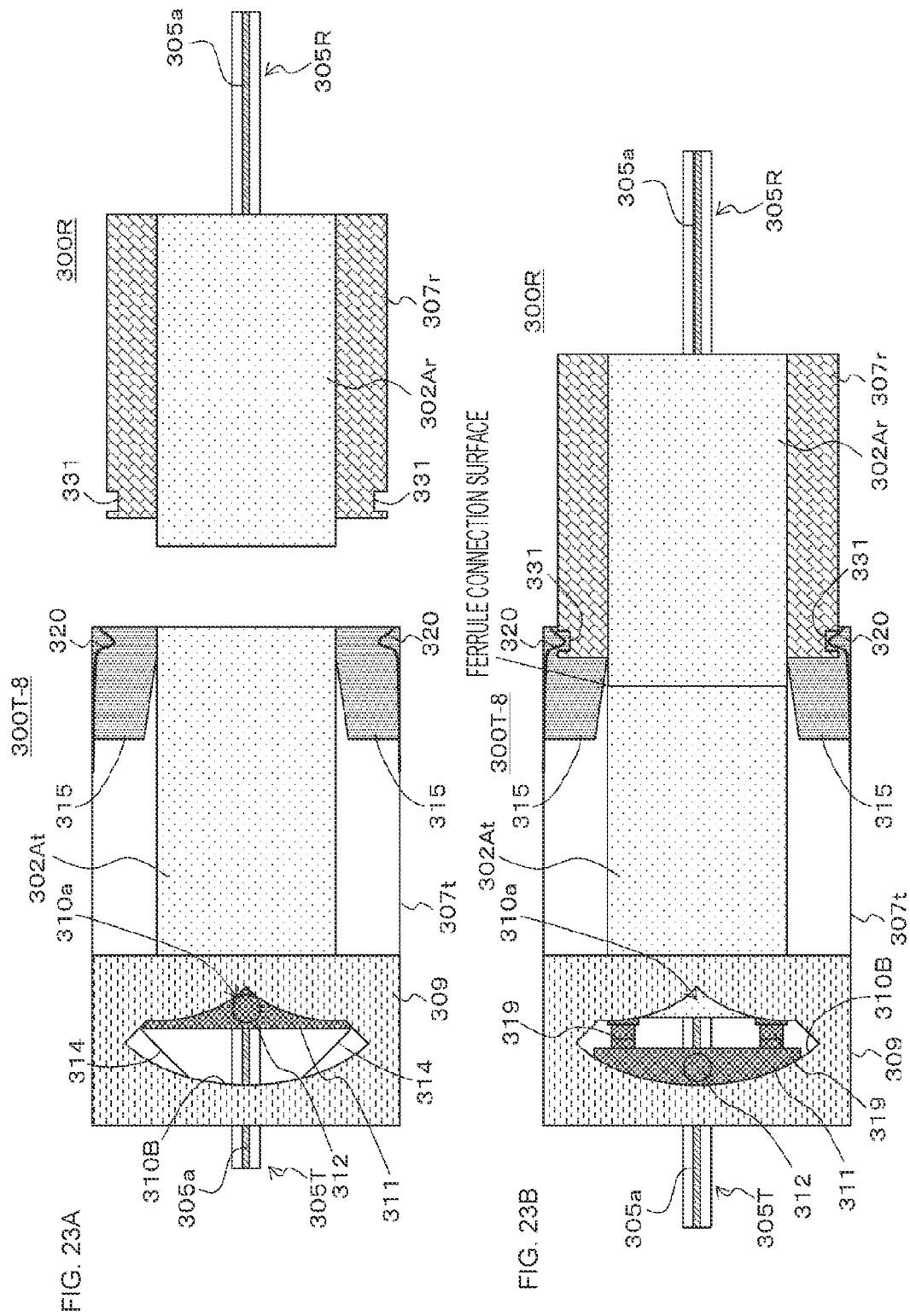
FIGS. 23A and 23B are views for describing a connection state between the transmission-side optical connector and a reception-side optical connector.

FIG. 23A illustrates a state before the reception-side optical connector 300R is connected. A lock portion 331 to be fitted to the lock portion 320 of the transmission-side optical connector 300T-8 is provided on a front surface side of the connector housing 307r of the reception-side optical connector 300R. The lock portion 331 is configured by a recess formed in an outer peripheral side of the connector housing 307r.

FIG. 23B illustrates a state in which a ferrule 302Ar of the reception-side optical connector 300R is connected at a vertical angle. In this case, the protrusion of the leaf spring constituting the lock portion 320 of the transmission-side optical connector 300T-8 is fitted into the recess of the lock portion 331 of the reception-side optical connector 300R and enters a locked state. As a result, it is possible to generate a force not being pushed back against a pushing back force by leaf springs 314 and a leaf spring 319, and the locked state is obtained.

Note that, when the reception-side optical connector 300R is inserted, the protrusion of the leaf spring constituting the lock portion 320 of the transmission-side optical connector 300T-8 moves to an outer peripheral side with the insertion of the reception-side optical connector 300R and then moves to an inner peripheral side at a position facing the recess of the lock portion 331 of the reception-side optical connector 300R to be in a fitted state. Furthermore, when the reception-side optical connector 300R is pulled out, a reverse operation to the insertion time is conducted.

Ninth Embodiment

In the above description, the structures for providing resistance to prying in the up-down direction at the time of fitting the connectors have been described but it is further conceivable to provide resistance to prying in a right-left direction at the time of fitting connectors.

Figure 24:
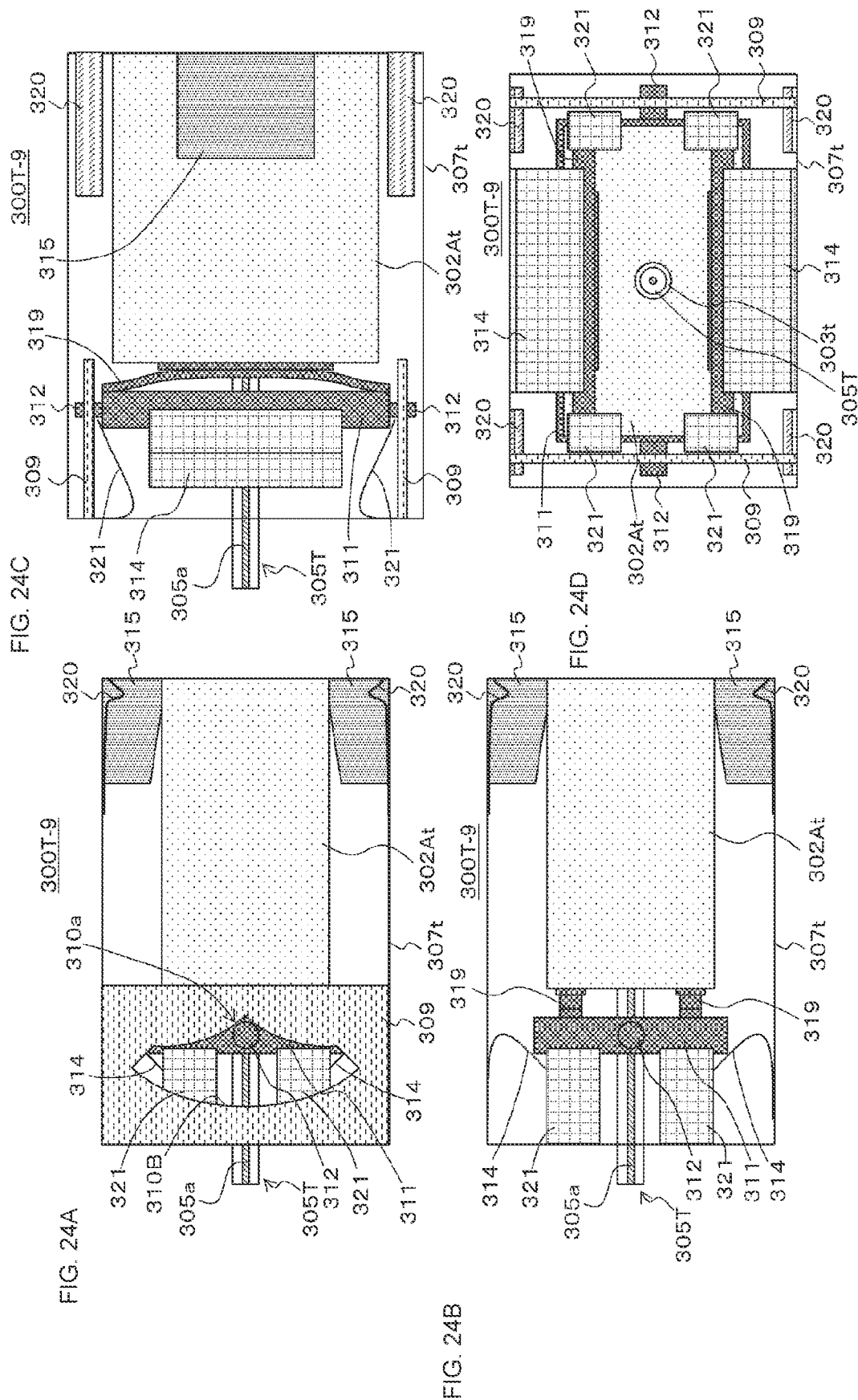
FIGS. 24A, 24B, 24C, and 24D are views illustrating a configuration example of a transmission-side optical connector as a ninth embodiment.

FIGS. 24A, 24B, 24C, and 24D illustrates a configuration example of a transmission-side optical connector 300T-9 as a ninth embodiment. In FIGS. 24A, 24B, 24C, and 24D, a part corresponding to that in FIGS. 22A, 22B, 22C, and 22D is given the same reference numeral, and detailed description thereof is appropriately omitted. FIG. 24A is a side view, FIG. 24B is a view in which members 309 with a guiderail are removed from the side view, FIG. 24C is a top view, and FIG. 24D is a rear view as viewed from an optical fiber insertion side.

Leaf springs 321 are disposed and fixed on both the right and left sides in a rear-side inside of a connector housing 307t in the transmission-side optical connector 300T-9. The leaf springs 321 constitute a biasing portion that biases a ferrule 302At in a front direction of the connector housing 307t, similarly to leaf springs 314.

The rest of the transmission-side optical connector 300T-9 is configured similarly to the transmission-side optical connector 300T-8 illustrated in FIGS. 22A, 22B, 22C, and 22D.

Figure 25:
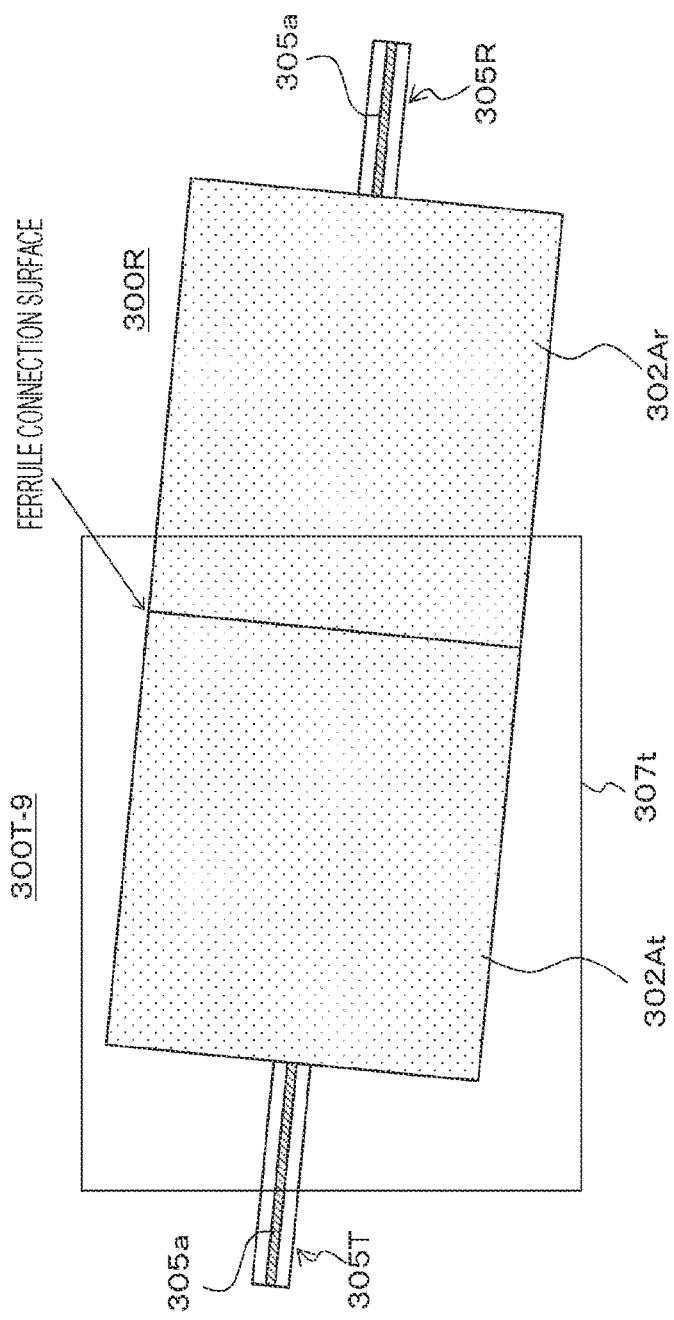
FIG. 25 is a view for describing a connection state between the transmission-side optical connector and a reception-side optical connector.

As described above, in the transmission-side optical connector 300T-9 illustrated in FIGS. 24A, 24B, 24C, and 24D, the leaf springs 321 are disposed and fixed on both the right and left sides in the rear-side inside of the connector housing 307t, and as illustrated in FIG. 25, even in a state where the connectors are connected at an oblique angle by a force of prying or the like in a right and left direction, it is possible to push back a shaft member 311 in a floating state by the leaf springs 321. Furthermore, by the leaf springs 321 disposed and fixed on both the right and left sides in this manner, the position of the ferrule 302At in the right and left direction at the time of non-fitting can also be maintained at an initial position. Note that FIG. 25 is a top view.

Tenth Embodiment

In the above description, the guiderails 310, 310A, or 310B have been provided on the connector housing 307t side and the shaft member 311 having the shafts 312 has been provided on the ferrule 302At side, but a configuration in which guiderails and a shaft member are provided on opposite sides is also conceivable.

FIGS. 26A, 26B, 26C, and 26D illustrate a configuration example of a transmission-side optical connector 300T-10 as a tenth embodiment. In FIGS. 26A, 26B, 26C, and 26D, a part corresponding to that in FIGS. 7A, 7B, 7C, and 7D is given the same reference numeral, and detailed description thereof is appropriately omitted. FIG. 26B is a side view, FIG. 26A is a side view in which members other than shafts 312 are removed from a shaft member 311, FIG. 26C is a top view, and FIG. 26D is a rear view as viewed from an optical fiber insertion side.

Guiderails 310 extending in one direction (up-down direction) orthogonal to a front-rear direction of a connector housing 307t are bored in a ferrule 302At on both the right and left sides on a rear surface side. The guiderail 310 is an arc-shaped groove or through-hole centered on a front surface side of the ferrule 302At. Furthermore, shaft members 311 are fixed to both the right and left sides in a rear-side inside of the connector housing 307t by, for example, adhesion or the like. A shaft 312 having a circular cross section is planted in the shaft member 311. The right and left shafts 312 are inserted into the guiderails 310 of the ferrule 302At.

As described above, the right and left shafts 312 on the rear surface side of the connector housing 307t are placed in a state of being inserted into the guiderails 310 of the ferrule 302At. As a result, the ferrule 302At is not fixed to the connector housing 307t but is in a floating state. In this case, the rear surface side of the ferrule 302At moves as the guiderails 310 move along the shafts 312.

The rest of the transmission-side optical connector 300T-10 is configured similarly to the transmission-side optical connector 300T-1 illustrated in FIGS. 7A, 7B, 7C, and 7D.

As described above, since the guiderail 310 is an arc-shaped hole centered on the front surface side of the ferrule 302At, the movable region on the rear surface side of the ferrule 302At is the arc-shaped region. As a result, the rear surface side of the ferrule 302At smoothly moves along the arc-shaped region, and the ferrule 302At can satisfactorily follow a force of prying or the like by a user, similarly to the transmission-side optical connector 300T-1 illustrated in FIGS. 7A, 7B, 7C, and 7D.

FIG. 27A illustrates a state in which a ferrule 302Ar of a reception-side optical connector 300R is connected at a vertical angle. FIG. 27B illustrates a state in which the ferrule 302Ar of the reception-side optical connector 300R is connected at an oblique angle by a force of prying or the like. In this case, since the ferrule 302At of the transmission-side optical connector 300T-10 is in the floating state, the ferrule 302At follows the ferrule 302Ar of the reception-side optical connector 300R, and a state in which ferrule connection surfaces are correctly connected is maintained.

2. Modification

Note that, in the above-described embodiments, examples of performing collimated coupling have been described, but the present technology can also be applied to a case of a physical contact (PC) type or other connection methods. Furthermore, a single mode or multiple modes may be adopted. Furthermore, the connection between the ferrules at the time of fitting the connectors may be by pins or uneven portions. Furthermore, the number of channels is not limited. In the case of multiple channels, it is possible to cope with the channels by increasing the number of optical fiber insertion holes provided in the ferrules. Furthermore, in the above-described embodiments, examples of the optical connectors have been described, but the application range of the present technology is not limited to the optical connectors.

Although the favorable embodiment of the present disclosure has been described in detail with reference to the accompanying drawings, the technical scope of the present disclosure is not limited to such examples. It is obvious that persons having ordinary knowledge in the technical field of the present disclosure can conceive various changes and alterations within the scope of the technical idea described in the claims, and it is naturally understood that these changes and alterations belong to the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification together with or in place of the above-described effects.

Note that the present technology can also have the following configurations.

(1) An optical connector including:
  a connector body disposed inside a connector housing; and
  a regulation portion that regulates a movable region on a rear surface side of the connector body, the movable region being in one direction orthogonal to a front-rear direction of the connector housing with respect to the connector housing.
(2) The optical connector according to (1), in which
the regulation portion includes a guiderail portion provided in the connector housing or the connector body.
(3) The optical connector according to (1) or (2), in which
the movable region is an arc-shaped region having a center on a front surface side of the connector body.
(4) The optical connector according to any one of (1) to (3), in which
the movable region is limited to a range in which the rear surface side of the connector body does not come into contact with the connector housing.
(5) The optical connector according to any one of (1) to (4), further including:
a biasing portion that biases the connector body in a front direction of the connector housing, in which
the regulation portion further regulates a moving region of the connector body in the front-rear direction of the connector housing.
(6) The optical connector according to (5), in which
the regulation portion has a groove portion for providing an initial position of the connector body on a front surface side of the connector housing.
(7) The optical connector according to (5) or (6), in which
the biasing portion is formed using an elastic member that presses the connector body in the front direction of the connector housing.
(8) The optical connector according to (7), in which
the biasing portion is leaf springs disposed on both sides in the one direction of the rear surface side of the connector housing.
(9) The optical connector according to (8), further including:
a leaf spring that is disposed on the rear surface side of the connector body and biases the connector body in the front direction of the connector housing.
(10) The optical connector according to (8) or (9), further including:
leaf springs disposed on both sides in another direction orthogonal to the one direction of the rear surface side of the connector housing.
(11) The optical connector according to (5) or (6), in which
the biasing portion is formed using an elastic member that pulls the connector body in the front direction of the connector housing.
(12) The optical connector according to (11), in which
the biasing portion is a resin member or a coil spring having elasticity and stretched between the connector housing and the connector body.
(13) The optical connector according to any one of (1) to (12), further including:
a holding portion having elasticity and which holds the connector body at an initial position.
(14) The optical connector according to (13), in which
the holding portion is a resin member or a spring member disposed between the connector body and the connector housing.
(15) The optical connector according to any one of (1) to (14), in which
the connector body is a ferrule with a lens.
(16) An optical cable having an optical connector as a plug, the optical connector including:
a connector body disposed inside a connector housing; and
a regulation portion that regulates a movable region on a rear surface side of the connector body, the movable region being in one direction orthogonal to a front-rear direction of the connector housing with respect to the connector housing.
(17) An electronic device having an optical connector as a receptacle, the optical connector including:
a connector body disposed inside a connector housing; and
a regulation portion that regulates a movable region on a rear surface side of the connector body, the movable region being in one direction orthogonal to a front-rear direction of the connector housing with respect to the connector housing.

REFERENCE SIGNS LIST

100 Electronic device
101 Optical communication unit
102 Light emitting unit
103, 104 Optical transmission line
105 Light receiving unit
200A, 200B Optical cable
201A, 201B Cable body
300T, 300T', 300T-1 to 300T-10 Transmission-side optical connector
300R Reception-side optical connector
301T, 301R Lens
301A, 301At Lens
302T, 302R Connector body
302A, 302At, 302Ar Ferrule with lens
303, 303t Optical fiber insertion hole
305, 305T, 305R Optical fiber
305a Core
305b Clad
306t, 306r Fixing member
307t, 307r Connector housing
308 Coil spring
309 Member with guiderail
310, 310A, 310B Guiderail
310a Groove
311 Shaft member
312 Shaft
313 Ferrule initial position adjustment spring
314 Leaf spring
315 Support member
316 Pin
317 Position adjustment ring
318 Position adjustment spring
319 Leaf spring
320 Lock portion
321 Leaf spring
331 Lock portion

The invention claimed is:
1. An optical connector, comprising:
a connector housing;
a connector body inside the connector housing;
a movable region on a rear surface side of the connector body; and
a regulation portion configured to regulate the movable region, wherein
the regulation portion includes a guiderail portion that comprises an arc-shaped hole having a center on a front surface side of the connector body,
the movable region is regulated along the arc-shaped hole, and the movable region is in a first direction orthogonal to a front-rear direction of the connector housing with respect to the connector housing.

2. The optical connector according to claim 1, wherein the movable region is limited to a range in which the rear surface side of the connector body does not come into contact with the connector housing.

3. The optical connector according to claim 1, further comprising:
a biasing portion that biases the connector body in a front direction of the connector housing, wherein
the regulation portion further regulates a moving region of the connector body in the front-rear direction of the connector housing.

4. The optical connector according to claim 3, wherein the regulation portion has a groove portion for providing an initial position of the connector body on the front surface side of the connector housing.

5. The optical connector according to claim 3, wherein the biasing portion is formed using an elastic member that presses the connector body in the front direction of the connector housing.

6. The optical connector according to claim 5, wherein the biasing portion is leaf springs disposed on both sides in the first direction of the rear surface side of the connector housing.

7. The optical connector according to claim 1, further comprising:
a leaf spring that is disposed on the rear surface side of the connector body and biases the connector body in the front direction of the connector housing.

8. The optical connector according to claim 1, further comprising:
leaf springs disposed on both sides in a second direction orthogonal to the first direction of the rear surface side of the connector housing.

9. The optical connector according to claim 3, wherein the biasing portion is formed using an elastic member that pulls the connector body in the front direction of the connector housing.

10. The optical connector according to claim 9, wherein the biasing portion is a resin member or a coil spring having elasticity and stretched between the connector housing and the connector body.

11. The optical connector according to claim 1, further comprising:
a holding portion having elasticity and which holds the connector body at an initial position.

12. The optical connector according to claim 11, wherein the holding portion is a resin member or a spring member disposed between the connector body and the connector housing.

13. The optical connector according to claim 1, wherein the connector body is a ferrule with a lens.

14. An optical cable, comprising:
an optical connector as a plug, wherein the optical connector includes:
a connector housing;
a connector body inside the connector housing;
a movable region on a rear surface side of the connector body; and
a regulation portion configured to regulate the movable region, wherein
the regulation portion includes a guiderail portion that comprises an arc-shaped hole having a center on a front surface side of the connector body,
the movable region is regulated along the arc-shaped hole, and
the movable region is in a direction orthogonal to a front-rear direction of the connector housing with respect to the connector housing.

15. An electronic device, comprising:
an optical connector as a receptacle, the optical connector includes:
a connector housing;
a connector body inside the connector housing;
a movable region on a rear surface side of the connector body; and
a regulation portion configured to regulate the movable region, wherein
the regulation portion includes a guiderail portion that comprises an arc-shaped hole having a center on a front surface side of the connector body,
the movable region is regulated along the arc-shaped hole, and
the movable region is in a direction orthogonal to a front-rear direction of the connector housing with respect to the connector housing.

* * * * *